United States Patent
Rong et al.

(10) Patent No.: US 10,156,368 B2
(45) Date of Patent: Dec. 18, 2018

(54) FIXING DEVICE FOR HEAT EXCHANGER

(71) Applicants: TRANE INTERNATIONAL INC., Davidson, NC (US); TRANE AIR CONDITIONING SYSTEMS (CHINA) CO., LTD., Taicang, Jiangsu (CN)

(72) Inventors: Guangwei Rong, Jiangsu (CN); Pingsen Duan, Jiangsu (CN); Qing Yang, Jiangsu (CN); Weifeng Han, Jiangsu (CN)

(73) Assignees: TRANE AIR CONDITIONING SYSTEMS (CHINA) CO., LTD., Taicang, Jiangsu Province (CN); TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 15/758,258

(22) PCT Filed: Sep. 25, 2015

(86) PCT No.: PCT/CN2015/090779
§ 371 (c)(1),
(2) Date: Mar. 7, 2018

(87) PCT Pub. No.: WO2017/049609
PCT Pub. Date: Mar. 30, 2017

(65) Prior Publication Data
US 2018/0245803 A1 Aug. 30, 2018

(51) Int. Cl.
*F24H 3/00* (2006.01)
*F24F 1/16* (2011.01)
(Continued)

(52) U.S. Cl.
CPC .................. *F24F 1/16* (2013.01); *F16B 2/22* (2013.01); *F16B 5/0685* (2013.01); *F28F 9/02* (2013.01)

(58) Field of Classification Search
CPC ... F24F 1/16; F16B 2/22; F16B 5/0685; F28F 9/02
(Continued)

(56) References Cited

U.S. PATENT DOCUMENTS 1,988,647 A * 1/1935 Emerson .................. E04D 3/08
52/204.67
2,662,745 A * 12/1953 Jorn ........................ F24D 3/165
165/185
(Continued)

FOREIGN PATENT DOCUMENTS

CN 203785517 U 8/2014

OTHER PUBLICATIONS

International Search Report and Written Opinion, International Patent Application No. PCT/CN2015/090779, dated Jun. 12, 2016 (8 pages).

*Primary Examiner* — Claire Rojohn, III
(74) *Attorney, Agent, or Firm* — Hamre, Schumann, Mueller & Larson, P.C.

(57) ABSTRACT

A fixing device includes a gasket and a clip. The clip includes a clip upper portion, a clip body portion, and a clip leg portion. The clip upper portion has a width wider than the clip body portion and the clip leg portion. The clip upper portion, the clip body portion, and the clip leg portion are connected to form an open loop facing downward. The gasket includes a gasket upper portion, a gasket intermediate portion, and a gasket base portion forming an "A" shape. The gasket is compressible. The clip upper portion and the clip body portion define two receiving areas evenly distributed at two inner sides of the clip. The gasket is evenly and (Continued)

simultaneously compressed toward the two receiving areas of the clip while the clip moves downward without tilting or slanting.

20 Claims, 15 Drawing Sheets

(51) Int. Cl.
   *F28F 9/02* (2006.01)
   *F16B 5/06* (2006.01)
   *F16B 2/22* (2006.01)

(58) Field of Classification Search
   USPC .......................................................... 165/47
   See application file for complete search history.

(56) References Cited

U.S. PATENT DOCUMENTS

| | | | | |
|---|---|---|---|---|
| 2,800,308 | A * | 7/1957 | Parkinson | E04B 9/26 165/136 |
| 2,818,235 | A * | 12/1957 | Baran | F24D 3/165 165/56 |
| 3,163,930 | A * | 1/1965 | Stanley | E06B 3/726 228/142 |
| 3,785,104 | A * | 1/1974 | Dailen | E04B 2/967 52/204.597 |
| 4,050,498 | A * | 9/1977 | Lucchetti | B44D 3/185 160/374.1 |
| 4,087,142 | A * | 5/1978 | Aumack | A47J 39/006 165/61 |
| 4,094,483 | A | 6/1978 | Busch | |
| 4,127,347 | A * | 11/1978 | Pritchard | E06B 3/9645 403/231 |
| 4,151,696 | A * | 5/1979 | Knights | E06B 3/56 264/261 |
| 4,203,486 | A * | 5/1980 | Rubbright | A47J 39/006 165/48.1 |
| 4,215,675 | A * | 8/1980 | Embree | F24S 25/67 126/661 |
| RE30,432 | E * | 11/1980 | Stoakes | E04B 2/60 52/395 |
| 4,254,824 | A * | 3/1981 | Springer | F25D 31/005 165/64 |
| 4,323,110 | A * | 4/1982 | Rubbright | F25D 23/12 165/201 |
| 4,348,435 | A * | 9/1982 | Mistrick | E06B 3/5427 156/109 |
| 4,351,390 | A * | 9/1982 | Argyle | F28F 9/0226 165/149 |
| 4,471,584 | A * | 9/1984 | Dietrich | E04B 7/10 52/14 |
| 4,485,867 | A * | 12/1984 | Melnyk | F28F 9/0226 165/173 |
| 4,500,572 | A * | 2/1985 | Francis | E04D 3/08 428/34 |
| 4,552,790 | A * | 11/1985 | Francis | E04D 3/08 428/34 |
| 4,557,089 | A * | 12/1985 | Breithaupt | E04B 2/92 52/235 |
| 4,579,375 | A * | 4/1986 | Fischer | F16L 23/14 285/363 |
| 4,581,868 | A * | 4/1986 | McCann | E04B 2/92 428/34 |
| 4,640,072 | A * | 2/1987 | Muhle | E04B 2/967 49/DIG. 1 |
| 4,664,551 | A * | 5/1987 | Poitier | B60H 1/00528 403/335 |
| 4,683,693 | A * | 8/1987 | Rockar | E04D 3/08 52/198 |
| 4,704,839 | A * | 11/1987 | Kay | E06B 3/267 49/DIG. 1 |
| 4,724,637 | A * | 2/1988 | Evans | E06B 3/5427 52/204.591 |
| 4,799,344 | A * | 1/1989 | Francis | E06B 3/5427 52/204.591 |
| 4,813,203 | A * | 3/1989 | Newman | E06B 3/5427 52/208 |
| 4,829,740 | A * | 5/1989 | Hutchison | E04B 2/90 52/475.1 |
| 4,848,448 | A * | 7/1989 | Kaarre | F28F 9/0219 165/158 |
| 4,899,815 | A * | 2/1990 | Bosch | F28F 9/0226 165/173 |
| 5,046,555 | A * | 9/1991 | Nguyen | F28F 9/182 165/173 |
| 5,094,560 | A * | 3/1992 | Gautier | B60T 13/569 403/23 |
| 5,138,820 | A * | 8/1992 | Pearce | E04D 3/08 52/204.67 |
| 5,178,213 | A * | 1/1993 | Watson | F28D 1/05366 165/173 |
| 5,195,579 | A * | 3/1993 | Buchanan | F28F 9/0224 165/149 |
| 5,195,582 | A * | 3/1993 | Haase | F28F 9/0226 165/149 |
| 5,201,368 | A * | 4/1993 | Kroetsch | F28F 9/0226 165/149 |
| 5,358,013 | A * | 10/1994 | McClain | F16L 23/14 138/109 |
| 5,462,089 | A * | 10/1995 | McClain | F16L 23/14 138/109 |
| 5,681,741 | A * | 10/1997 | Atwood | B01J 19/0046 422/566 |
| 6,301,901 | B1 * | 10/2001 | Coffee | A45C 11/20 165/123 |
| 6,401,807 | B1 * | 6/2002 | Wyler | H01L 23/3672 165/121 |
| 6,735,921 | B2 * | 5/2004 | Oberhofer | E04F 13/0835 403/388 |
| 6,781,830 | B2 * | 8/2004 | Barth | H05K 7/20445 165/185 |
| 7,142,430 | B2 * | 11/2006 | Lee | H01L 23/4093 361/719 |
| 7,426,955 | B2 * | 9/2008 | Kimura | F28D 1/05366 165/76 |
| 7,640,971 | B2 * | 1/2010 | Kolb | B21D 53/08 165/149 |
| 7,849,636 | B2 * | 12/2010 | Baudhuin | A01G 9/1476 52/13 |
| 8,313,706 | B2 * | 11/2012 | Seo | B01J 3/002 165/154 |
| 8,317,235 | B2 * | 11/2012 | Kipker | F16B 2/245 285/406 |
| 8,640,466 | B2 * | 2/2014 | Bell | F25B 21/02 62/3.7 |
| 8,771,156 | B2 * | 7/2014 | Chen | F16B 2/08 403/338 |
| 9,068,353 | B1 * | 6/2015 | Kovalchuk | E04F 13/12 |
| 9,282,823 | B2 * | 3/2016 | Kumazawa | A47C 1/124 |
| 9,328,966 | B2 * | 5/2016 | Brauning | F28D 1/05366 |
| 9,488,417 | B2 * | 11/2016 | Garret | F28D 7/1684 |
| 2002/0029866 | A1 * | 3/2002 | Gille | F28D 1/0435 165/76 |
| 2004/0057212 | A1 * | 3/2004 | Russell | H01L 23/4006 361/704 |
| 2009/0056918 | A1 * | 3/2009 | Li | H01L 23/40 165/104.33 |
| 2010/0112930 | A1 * | 5/2010 | Grigsby | F24F 3/0442 454/333 |

\* cited by examiner

FIXING DEVICE FOR HEAT EXCHANGER

FIELD

The disclosure generally relates to a refrigeration circuit including heat exchangers. More specifically, the disclosure relates to a fixing device that is used in assembling a heat exchanger, e.g., a microchannel heat exchanger.

BACKGROUND

A refrigeration circuit can be used in a heating, ventilating, air conditioning (HVAC) system. A refrigeration circuit may include one or more heat exchangers. In one embodiment, the heat exchanger can be a microchannel heat exchanger. One or more fans may be included within the heat exchanger to facilitate the air flow and enhance the heat exchanging efficiency. A heat exchanger may include a plurality of structural components. Some structural components of the heat exchanger may be assembled together.

SUMMARY

The disclosure generally relates to a refrigeration circuit including heat exchangers. More specifically, the disclosure relates to a fixing device that is used in assembling a heat exchanger, e.g., a microchannel heat exchanger.

In some situations, the heat exchanger in a refrigeration circuit is a microchannel heat exchanger. The microchannel heat exchanger may have a plurality of heat exchanging coils that include a plurality of microchannels for facilitating the heat exchanging process. In one embodiment, the heat exchanger has one or more heat exchanging coils, partly forming exterior panels of the heat exchanger. The weight of a top surface panel is a load on top of the heat exchanging coil. The top surface panel may provide structural support and may stabilize the assembly of the heat exchanger. The top surface panel may also provide additional weather protection of the components disposed inside the heat exchanger, e.g., fans, piping, duct accesses, etc.

In one situation, to properly install the top surface panel that covers the heat exchanger, a fixing device may be desired. In another situation, it may be desired that the fixing device is easy to install and easy to attach to the top surface of the heat exchanging coil. In another situation, it may be desired that the fixing device is easy to be detached and yet re-attachable. In another situation, it may be desired that the fixing device may provide a relatively strong support, yet remain elastic. The elasticity of the fixing device may help to absorb shocks or vibrations.

In one embodiment, the fixing device has a clip covering a gasket. The clip is relatively rigid compared to the gasket. When the top surface panel moves down, the clip moves down and the gasket is gradually compressed. In one embodiment, the clip includes two receiving areas at two inner sides. While the clip moves down, the gasket can be symmetrically compressed into the two receiving areas of the clip without tiling or slanting, providing good support to the top surface panel. In one embodiment, the compressed gasket gradually and simultaneously moves toward the receiving areas. In one embodiment, when the gasket is completely compressed, the gasket fills the receiving area of the clip. The above mentioned embodiments are exemplary only and are in no way limiting.

The embodiments of a fixing device disclosed herein may have the following benefits: easy to install, reduced labor in assembling a heat exchanger, reduced material in assembly a heat exchanger (e.g., screws, nuts, bolts, etc), reduced cost, no screw damages to the heat exchanging coil, increased gasket structure stability (no tilting, no slanting).

In one situation, it may be desired that a gasket of the fixing device is made with elastic material, e.g. plastic, rubber, resin, etc. In one situation, the more the gasket is compressed, the more support the gasket may provide.

In one embodiment, a fixing device includes a gasket. The gasket further includes a gasket upper portion, a gasket intermediate portion connected to a lower end of the gasket upper portion, a gasket base portion connected to a lower end of the gasket intermediate portion, and a gasket leg portion connected to a lower end of the gasket base portion. The gasket leg portion includes two legs extending downward from the gasket base portion in a direction away from the gasket intermediate portion. The gasket upper portion, the gasket intermediate portion, and the gasket base portion form a closed loop. The fixing device further includes a clip. The clip further includes a clip upper portion, a clip body portion connected to a lower end of the clip upper portion, and a clip leg portion connected to a lower end of the clip body portion. The clip leg portion includes two legs extending downward from the clip body portion. The clip upper portion, the clip body portion, and the clip leg portion are connected to form an open loop, and the open loop has an opening facing downward. The clip upper portion and the clip body portion define two receiving areas evenly distributed at two inner sides of the clip. An inner surface of the clip generally faces an outer surface of the gasket, forming a fixing device. The gasket is evenly and simultaneously compressed toward the two receiving areas of the clip while the clip moves downward.

In one embodiment, a heat exchanger includes a heat exchanging coil, a gasket disposed on top of the heat exchanging coil, and a plurality of clips disposed on top of the heat exchanging coil. Each clip has an inner surface facing an outer surface of the gasket. The clips are disposed along a direction of the heat exchanging coil with an interval between two clips. The gasket further includes a gasket upper portion, a gasket intermediate portion connected to a lower end of the gasket upper portion, a gasket base portion connected to a lower end of the gasket intermediate portion, and a gasket leg portion connected to a lower end of the gasket base portion. The gasket leg portion includes two legs extending downward from the gasket base portion in a direction away from the gasket intermediate portion. The gasket upper portion, the gasket intermediate portion, and the gasket base portion form a closed loop in a direction of the gasket. The clip of the heat exchanger further includes a clip upper portion, a clip body portion connected to a lower end of the clip upper portion, and a clip leg portion connected to a lower end of the clip body portion. The clip leg portion includes two legs extending downward from the clip body portion. The clip upper portion, the clip body portion, and the clip leg portion are connected to form an open loop. The open loop has an opening facing downward. The clip upper portion and the clip body portion define two receiving areas evenly distributed at two inner sides of the clip. An inner surface of the clip generally faces an outer surface of the gasket. The gasket is evenly and simultaneously compressed toward the two receiving areas of the clip while the clip moves downward.

In one embodiment, a method to install a fixing device on a heat exchanger includes attaching a gasket on a top surface of a heat exchanging coil, covering the gasket with a clip, clipping the clip on the heat exchanging coil through a clip body portion of the clip, and sliding down the clip, such that gasket is compressed. In one embodiment, sliding down the clip is caused by sliding down a top surface panel of a heat exchanger.

DETAILED DESCRIPTION

The term "receiving area" refers to one or more areas defined between a clip and a gasket of a fixing device. The receiving area is receivable of the gasket when the gasket is compressed due to a relative movement between the clip and the gasket. In one embodiment, when the gasket is compressed, a portion of the compressed gasket extends into the receiving area.

The term "area distribution" refers to a distribution of receiving area(s). Receiving area(s) being in an "area distribution" means that the receiving area(s) may or may not be evenly distributed in relation to the clip, the gasket, and/or the fixing device. The term "area distribution" also means that when a compressed gasket extends into a receiving area in an area distribution, the gasket is compressed without tilting or slanting. It is appreciated that the term "area distribution" includes the term "even distribution" and the term "evenly distributed."

The term "even distribution" and/or "evenly distributed" refers to a distribution of receiving area(s). Receiving area(s) being in an "even distribution" means that the receiving area(s) is evenly distributed in relation to the clip, the gasket, and/or the fixing device. The term "even distribution" also means that when a compressed gasket extends into a receiving area in an even distribution, the gasket is compressed without tilting or slanting. In one embodiment, receiving areas in even distribution includes the feature that the receiving areas symmetrically distributed on two sides of a clip and/or gasket along a center line. In one embodiment, receiving areas in even distribution includes the feature that the receiving areas are oppositely disposed along two sides of a clip and/or a gasket. In one embodiment, receiving areas in even distribution includes the feature that the receiving areas on two sides of the gasket are equal or about equal to each other.

Figure 1:
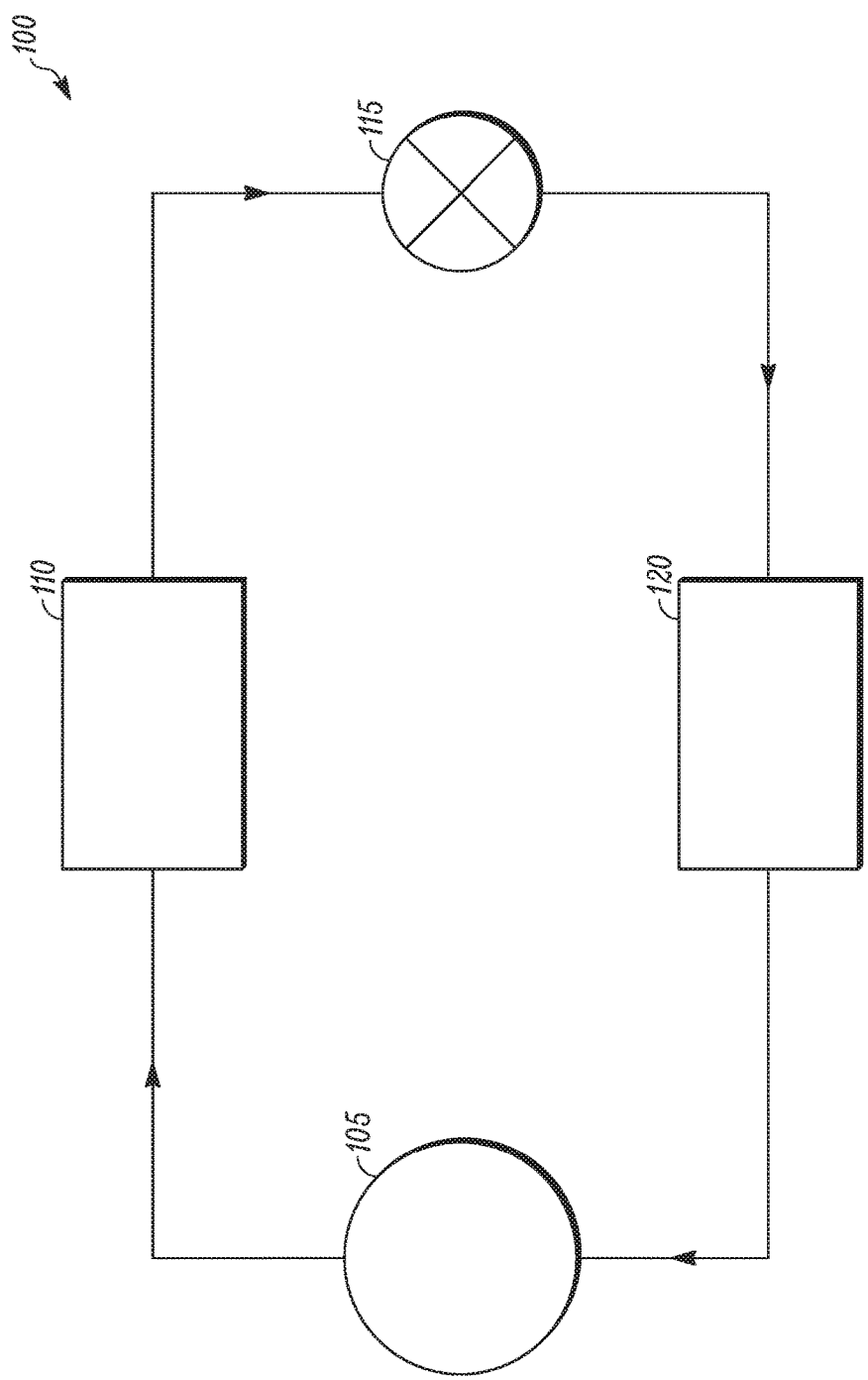
FIG. 1 illustrates an embodiment of a schematic configuration of a refrigeration circuit.

FIG. 1 illustrates an embodiment of a schematic configuration of a refrigeration circuit 100. The refrigeration circuit 100 may include the heat exchanger 200 shown in FIG. 2. The elements in the refrigeration circuit 100 may include the embodiments of gasket 300 in FIG. 3, the clip 400 in FIGS. 4A-4B, the fixing device 500 in FIG. 5, and the fixing device 600 in FIG. 6. The refrigeration circuit 100 may implement the method 700 in FIG. 7. The refrigeration circuit 100 may include a fixing device that satisfies the data shown in FIG. 8.

As shown in FIG. 1, in one embodiment, the refrigeration circuit 100 includes a compressor 105, a first heat exchanger 110, an expansion device 115, and a second heat exchanger 120. Arrows in FIG. 1 indicate working fluid flow direction.

The compressor 105 compresses a working fluid. The compressor is disposed upstream of the first heat exchanger 110. The working fluid being compressed by the compressor 105 may have a relatively high temperature and high pressure. The first heat exchanger 110 may perform a heat exchanging process between an ambient air and the compressed working fluid to reduce the temperature and the pressure of the working fluid.

The expansion device 115 may release a pressure of the working fluid, such that e.g., the temperature of the working fluid further reduced. In one example, the temperature of the working fluid leaving the expansion device 115 is lower than ambient temperature. The second heat exchanging device 120 performs another heat exchanging process between the working fluid and the ambient air to provide air conditioning to an ambient air, e.g., the air in an indoor space.

In one embodiment, the first 110 and the second 120 heat exchangers may be microchannel heat exchangers that include one or more heat exchanging coils. In one embodiment, the heat exchanger 110, 120 may include one or more heat exchanging coils in an up-right position, partly forming exterior panels of the heat exchanger. In one embodiment, the heat exchanger 110, 120 may be assembled in a manner that needs a gasket, e.g. the gasket 300, and a clip, e.g., the clip 400, to stabilize the assembly of the heat exchanging coils and the top panel.

Figure 2A:
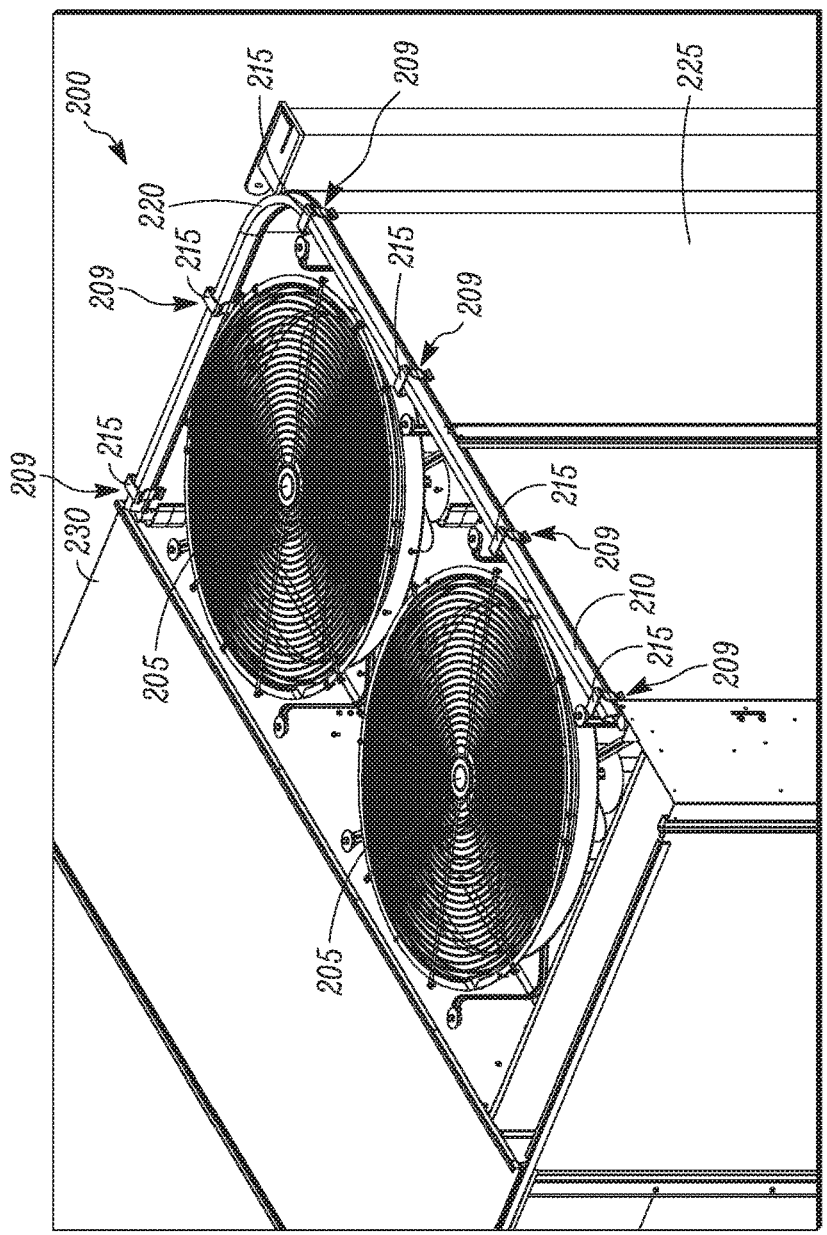
FIGS. 2A-2B illustrate an embodiment of a heat exchanger.
Figure 2A:
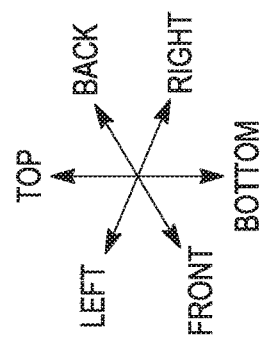
Figure 2B:
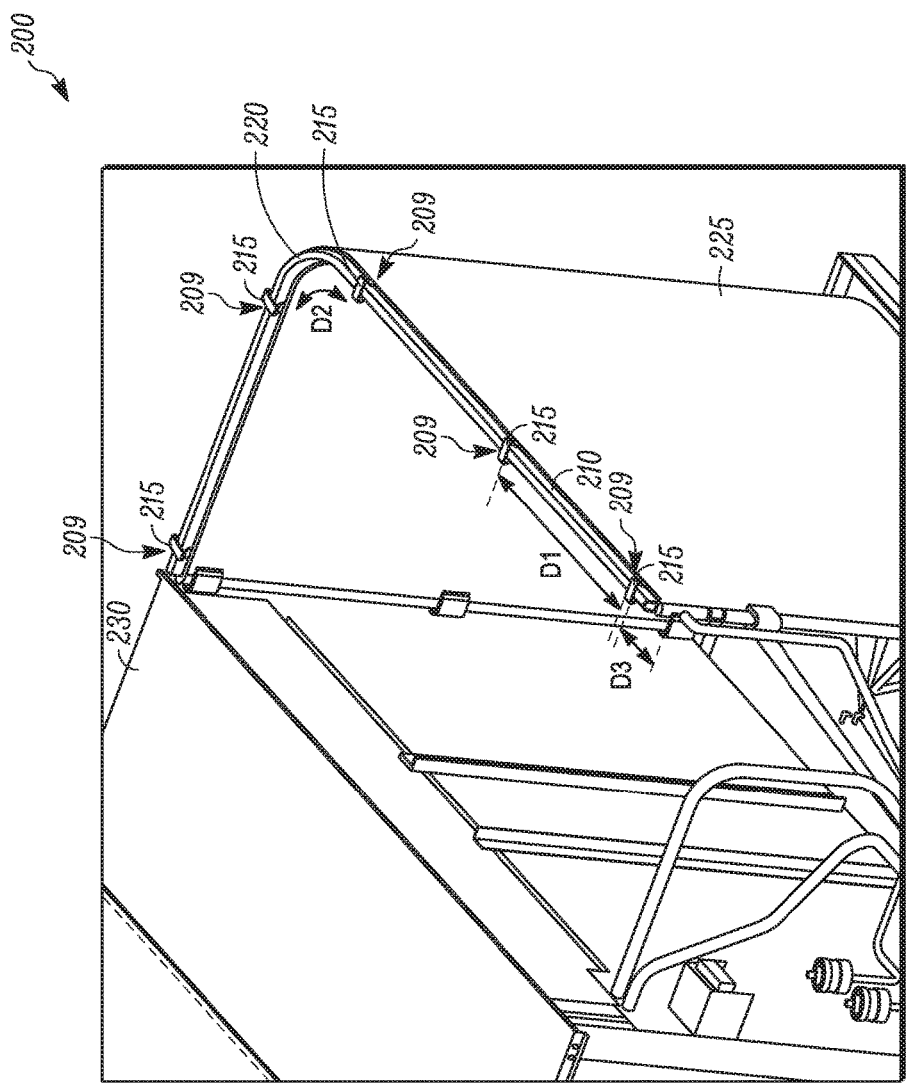
Figure 2B:
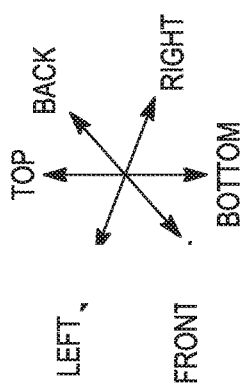

FIGS. 2A-2B illustrate an embodiment of a heat exchanger 200. The heat exchanger 200 may be the heat exchangers 110, 120 in FIG. 1. The heat exchanger 200 may include the gasket 300 in FIG. 3 and/or the clip 400 in FIGS. 4A-4B. The heat exchanger 200 may include the fixing device 500 in FIG. 5. The heat exchanger 200 may include the fixing device 600 in FIG. 6. The heat exchanger 200 may implement the method 700 in FIG. 7. The heat exchanger 200 may include a fixing device that satisfies the data shown in FIG. 8. The directional axes used in FIGS. 2A-2B are for clarity purposes and should not be conceived as limiting the orientation of the embodiments in any manner.

As shown in FIG. 2A-2B, the heat exchanger 200 includes heat exchanging coil 225. FIG. 2A shows a heat exchanger with fans 205. FIG. 2B shows a heat exchanger without fans.

In one embodiment, the heat exchanger 200 includes at least one heat exchanging coil 225. The heat exchanging coils may be part of side panels of a heat exchanger. The heat exchanger may include one or more angled sections 220 where the heat exchanging coils turn or join together as shown in FIG. 2. In one embodiment, the heat exchanging coils 225 encircles fans 205, as shown in FIG. 2. In another embodiment, the heat exchanging coils 225 may encircle tubings, fluid conducting channels, and/or duct works for conducting various working fluids, e.g., air, refrigerant, oil, etc.

In one embodiment, the heat exchanging coils 225 are microchannel heat exchanging coils.

The heat exchanger 200 further includes a top panel 230 covering the top of the heat exchanging coils 225. As shown in FIG. 2, the top panel 230 is assembled to the heat exchanging coils through a plurality of fixing devices 209. One fixing device 209 includes a gasket 210 and a clip 215.

In one embodiment, the gasket 210 is made with elastic materials, e.g., rubber, resin, elastomer, etc. In one embodiment, the gasket 210 is a strip. In one embodiment, the gasket 210 attaches to a top surface of the heat exchanging coils 225 and extend for the full length of the top surface including the angled section 220, as shown in FIG. 2.

As shown in FIGS. 2A and 2B, the fixing devices 209 further include a plurality of clips 215 and one or more gasket 210. As shown in FIG. 2B, in a straight section of the heat exchanging coil 225, the distance between two clips may be D1. As shown in FIG. 2B, in an angled section 220, the distance between two clips may be D2. In one embodiment, D1 may be equal or larger than D2. It is noted, the relationship between D1 and D2 is not limited. It is possible that D1 may be smaller than D2.

In one embodiment, D1 can be from at or about 20 inches to at or about 25 inches. In another embodiment, D1 can be from at or about 22 inches to at or about 24 inches. In one embodiment, the D2 can be from at or about 10 inches to at or about 20 inches.

As shown in FIG. 2B, the distance between an end of the heat exchanging coil 225 and the closest clip 215 is D3. In one embodiment, D3 can be from at or about 1 inch to at or about 5 inches. In another embodiment, D3 can be from at or about 2 inches to at or about 3 inches.

Figure 3A:
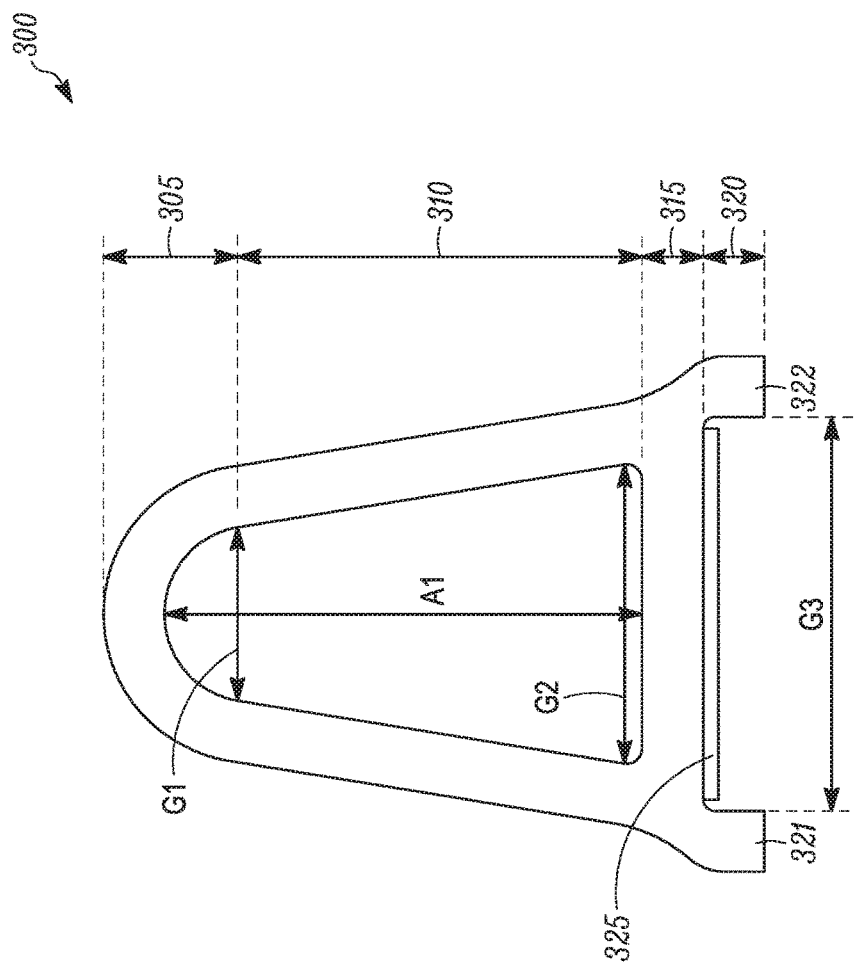
FIGS. 3A-3B illustrate an embodiment of a gasket.
Figure 3A:
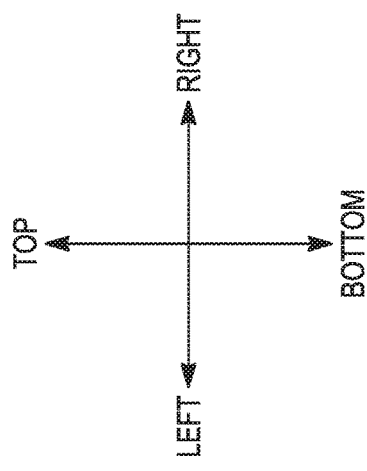
Figure 3B:
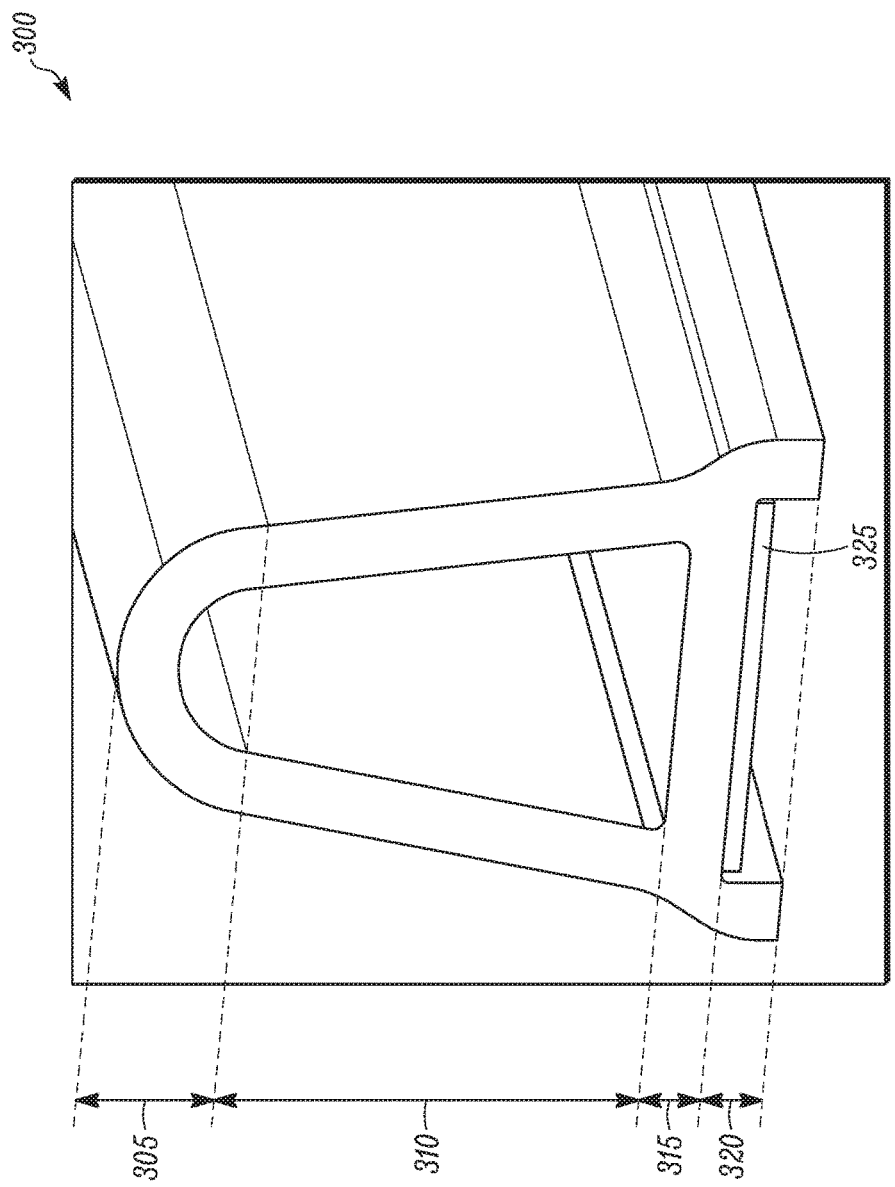

FIGS. 3A-3B illustrate an embodiment of a gasket 300. The gasket 300 may be used in the heat exchangers 110, 120 in the refrigeration circuit 100 shown in FIG. 1. The gasket 300 may be combined with the clip 400 in FIGS. 4A-4B to form a fixing device. The gasket 300 may be used in the fixing device 500 in FIG. 5 and the fixing device 600 in FIG. 6. The gasket 300 may be used as a part to implement the method 700 in FIG. 7. The gasket 300 may satisfy the data shown in FIG. 8. The directional axes used in FIG. 3A are for clarity purposes and should not be conceived as limiting the orientation of the embodiments in any manner.

As shown in FIGS. 3A-3B, the gasket 300 is roughly in an "A" shape. The gasket 300 includes a gasket upper portion 305, a gasket intermediate portion 310, and a gasket base portion 315. The gasket intermediate portion 310 is connected to a lower end of the gasket upper portion 305. The gasket base portion 315 is connected to a lower end of the gasket intermediate portion 310. The gasket upper portion 305, the gasket intermediate portion 310, and the gasket base portion 315 form a closed loop with a height A1.

In one embodiment, the gasket 300 is made with elastic materials, e.g. rubber, resin, elastomer, etc. Thus, the gasket 300 is able to deform due to external forces. In one embodiment the height A1 can be compressed because of increasing external forces.

As shown in FIGS. 3A-3B, the gasket 300 includes a gasket leg portion 320 connected to a lower end of the gasket base portion 315, the gasket leg portion 320 including two legs 321, 322 extending downward from the gasket base portion 315 in a direction away from the intermediate portion 310. In one embodiment, when the gasket 300 is attached to a top surface of a heat exchanging coil, e.g., the heat exchanging coil 225, the two legs 321, 322 attach to the side surfaces of the heat exchanging coil. The gasket base portion 315 and the gasket leg portion 320 wraps around the heat exchanging coil. The two legs 321, 322 increase the stability of the attachment between the gasket 300 and a heat exchanging coil.

Further, as shown in FIGS. 3A-3B, the gasket includes a layer of adhesive material 325. The adhesive layer 325 may stabilize the relative positions the gasket 300 when attached to a top surface of a heat exchanging coil, e.g., the heat exchanging coil 225. In one embodiment, the adhesive material 325 may allow the gasket 300 to be detached from the attached structure. In another embodiment, the adhesive material 325 may allow the gasket 300 to be re-attachable.

As shown in FIGS. 3A-3B, the gasket upper portion 305 is curved. The lower end of the gasket upper portion 305 has a width G1.

As shown in FIGS. 3A-3B, the upper end of the gasket intermediate portion 310 is connected to the lower end of the gasket upper portion 305, thus, the upper end of the gasket intermediate portion 310 has the same width of G1 as the lower end of the gasket upper portion 305. A lower end of the gasket intermediate portion 310 has a width G2. As shown in FIG. 3, the gasket intermediate portion 310 is configured such that the upper end is relatively narrower than the lower end. This also means, G2 is equal or greater than G1.

As shown in FIGS. 3A-3B, the two legs 321, 322 are spaced apart with a distance G3. In one embodiment, G3 is equal or greater than G2. In another embodiment, G3 generally matches a width of the top surface of a heat exchanging coil, e.g. as shown in FIG. 2 and FIG. 5.

Figure 4A:
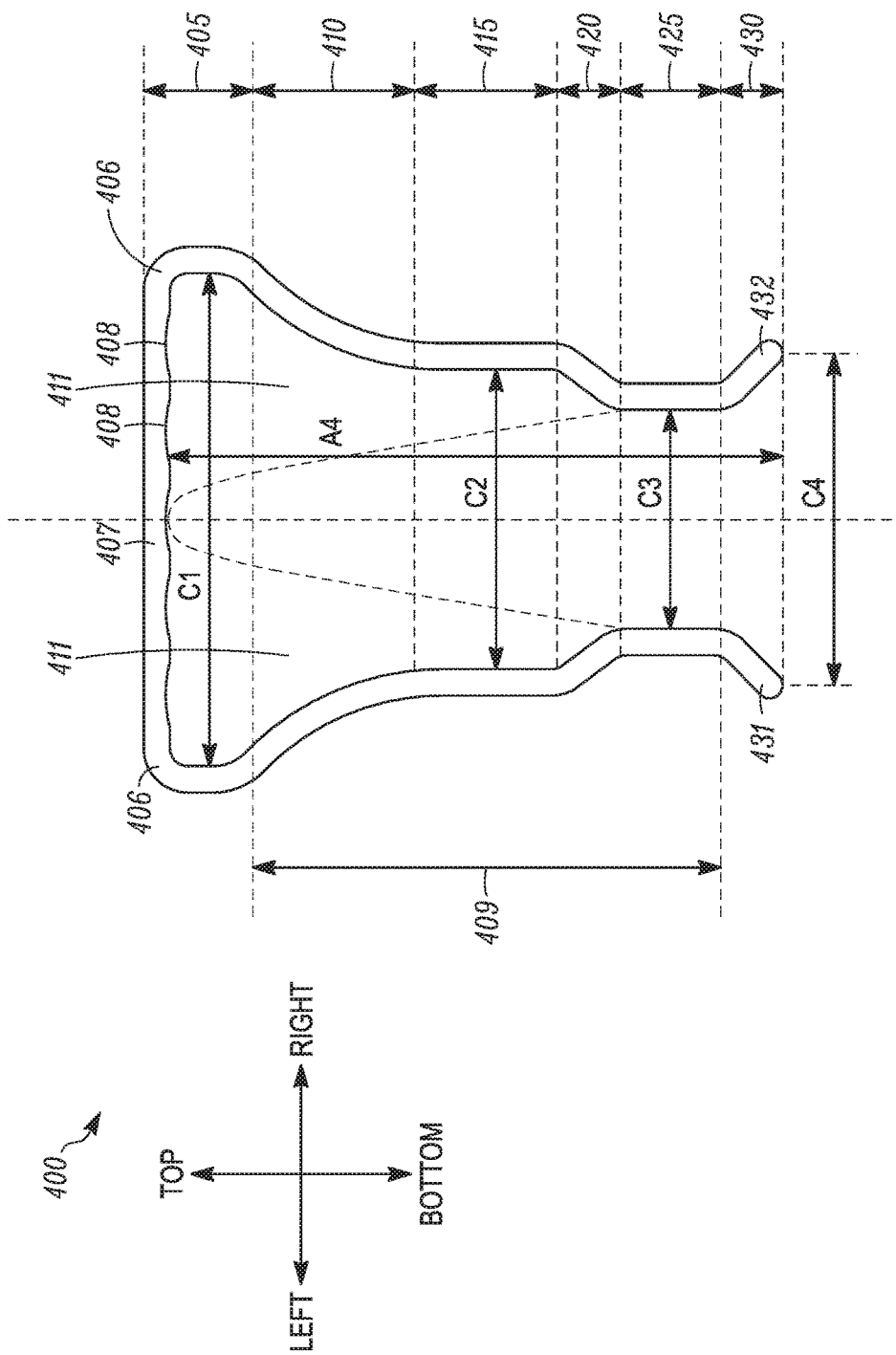
FIGS. 4A-4B illustrate an embodiment of a clip.
Figure 4B:
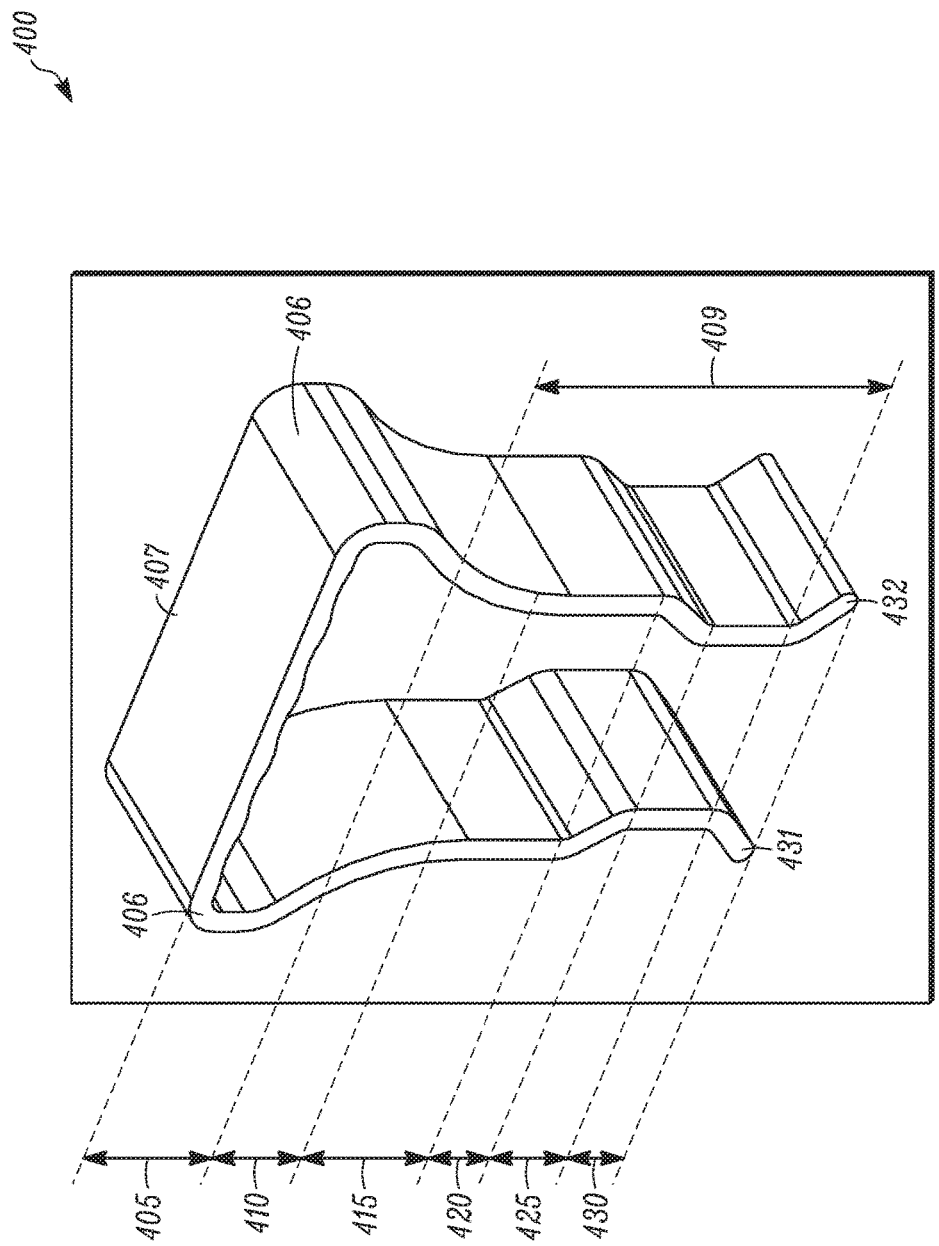

FIGS. 4A-4B illustrate an embodiment of a clip 400. The clip 400 may be used in the heat exchangers 110, 120 in the refrigeration circuit 100 shown in FIG. 1. The clip 400 may be combined with the gasket 300 in FIG. 3 to form a fixing device. The clip 400 may be used in the fixing device 500 in FIG. 5 and the fixing device 600 in FIG. 6. The clip 400 may be used as a component to implement the method 700 in FIG. 7. The clip 400 may satisfy the data shown in FIG. 8. The directional axes used in FIG. 4A are for clarity purposes and should not be conceived as limiting the orientation of the embodiments in any manner.

As shown in FIGS. 4A-4B, a clip includes a clip upper portion 405, a clip body portion 409, and a clip leg portion 430. The clip body portion 409 is connected to a lower end of the clip upper portion 405. The clip leg portion 430 is connected to a lower end of the clip body portion 409. The clip leg portion 430 includes two legs 431, 432 extending downward from the clip body portion 409. The clip upper portion 405 and the clip body portion 409 define two receiving areas 411 evenly distributed at two inner sides of the clip 400. The two receiving areas 411 receive a compressed gasket, e.g., the gasket 300, without allowing the gasket to tilt or slant.

As shown in FIGS. 4A-4B, the clip upper portion 405, the clip body portion 409, and the clip leg portion 430 are connected to form an open loop, the open loop has an opening facing downward.

In one embodiment, when the clip 400 is assembled with the gasket, e.g., the gasket 300, an inner surface of the clip 400 generally faces an outer surface of the gasket 300.

As shown in FIG. 4A, the clip upper portion 405 further includes a cross section 407 extending from left to right. The clip upper portion 405 includes two corner sections 406. Each corner section 406 includes an angle at or about 90°. The clip upper portion 405 has a width C1. An inner surface of the cross section 407 has friction structures 408, e.g. grooves, ridges, protrusions, ripples, fins, etc. The friction structures may increase friction between the clip 400 and the gasket, e.g., the gasket 300, when assembled.

As shown in FIGS. 4A-4B, the clip body portion 409 includes a first transition portion 410, a middle portion 415, a second transition portion 420, and an extension portion 425. The first transition portion 410 is connected to the lower end of the clip upper portion 405. The first transition portion 410 extends downward from the clip upper portion 405. In one embodiment, the first transition portion 410 extends inward from the clip upper portion 405, such that a lower part of the first transition portion 410 has a narrower width than an upper part of the first transition portion 410. The first transition portion 410 is configured at an angle with the clip upper portion 405.

As shown in FIGS. 4A-4B, the middle portion 415 is connected to a lower end of the first transition portion 410. The middle portion 415 extends downward from the first transition portion 410. In one embodiment, as shown in FIG. 4A, the middle portion 415 is configured in a top to bottom direction. The middle portion 415 has a width C2.

As shown in FIGS. 4A-4B, the second transition portion 420 is connected to a lower end of the middle portion 415, the second transition portion 420 extends downward from the middle portion 415. In one embodiment, the second transition portion 420 extends inward from the middle portion 415.

As shown in FIG. 4A, the extension portion 425 is connected to a lower end of the second transition portion 420. The extension portion 425 extends downward from the second transition portion 420. In one embodiment, the extension portion 425 is in a top to bottom direction. The extension portion has a width C3.

As shown in FIG. 4A, the clip leg portion 430 includes two legs 431, 432 extending downward from the clip body portion 409. In one embodiment, the clip leg portion 430 is connected to a lower end of the extension portion 425. In one embodiment, the two legs 431, 432 are configured to extend outward from the extension portion 425. In one embodiment, there is a distance C4 between the two legs 431, 432.

In one embodiment, C2 is equal or smaller than C1. In another embodiment, C3 is equal or smaller than C2. In one embodiment, C4 is equal or larger than C3. It is noted the mentioned embodiments are exemplary only and are in no way limiting the configuration of the clip 400.

As shown in FIG. 4, the clip 400 has a height A4. In one embodiment, the height A4 of the clip is equal or larger than a height of a gasket, e.g., the height A1 of gasket 300.

Figure 5B:
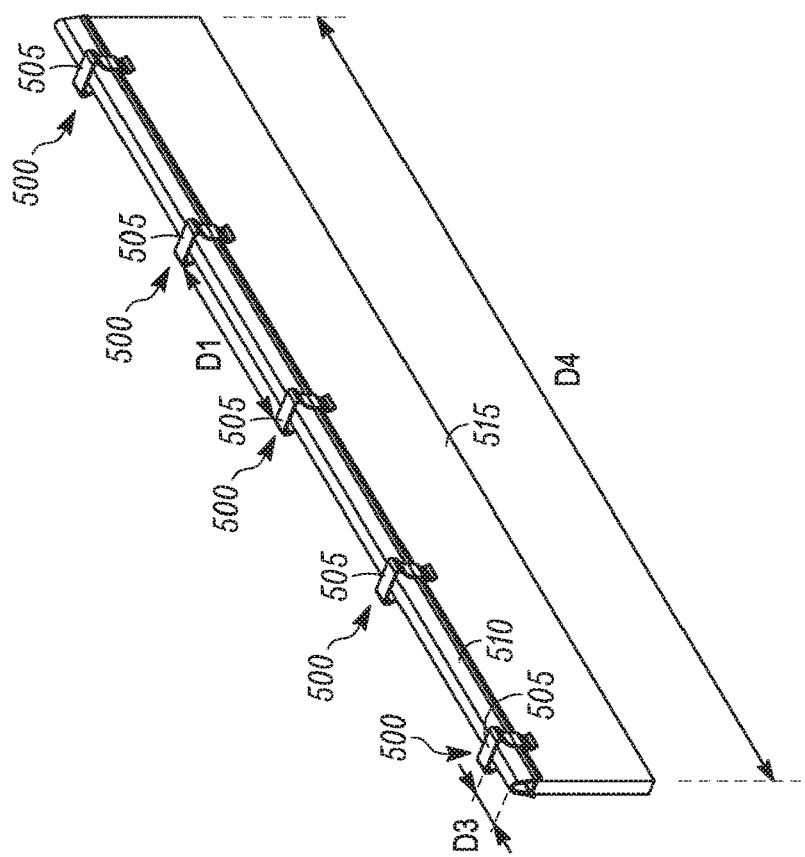
FIGS. 5A-5C illustrate an embodiment of a fixing device.
Figure 5A:
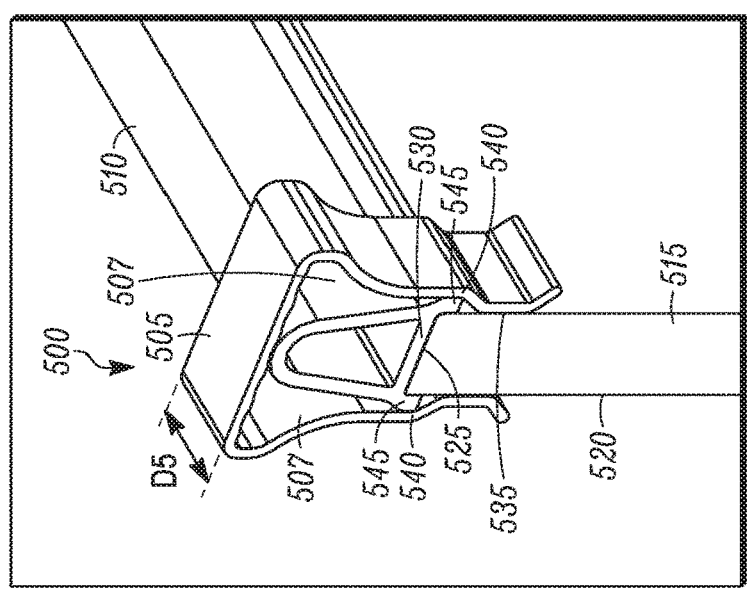
Figure 5C:
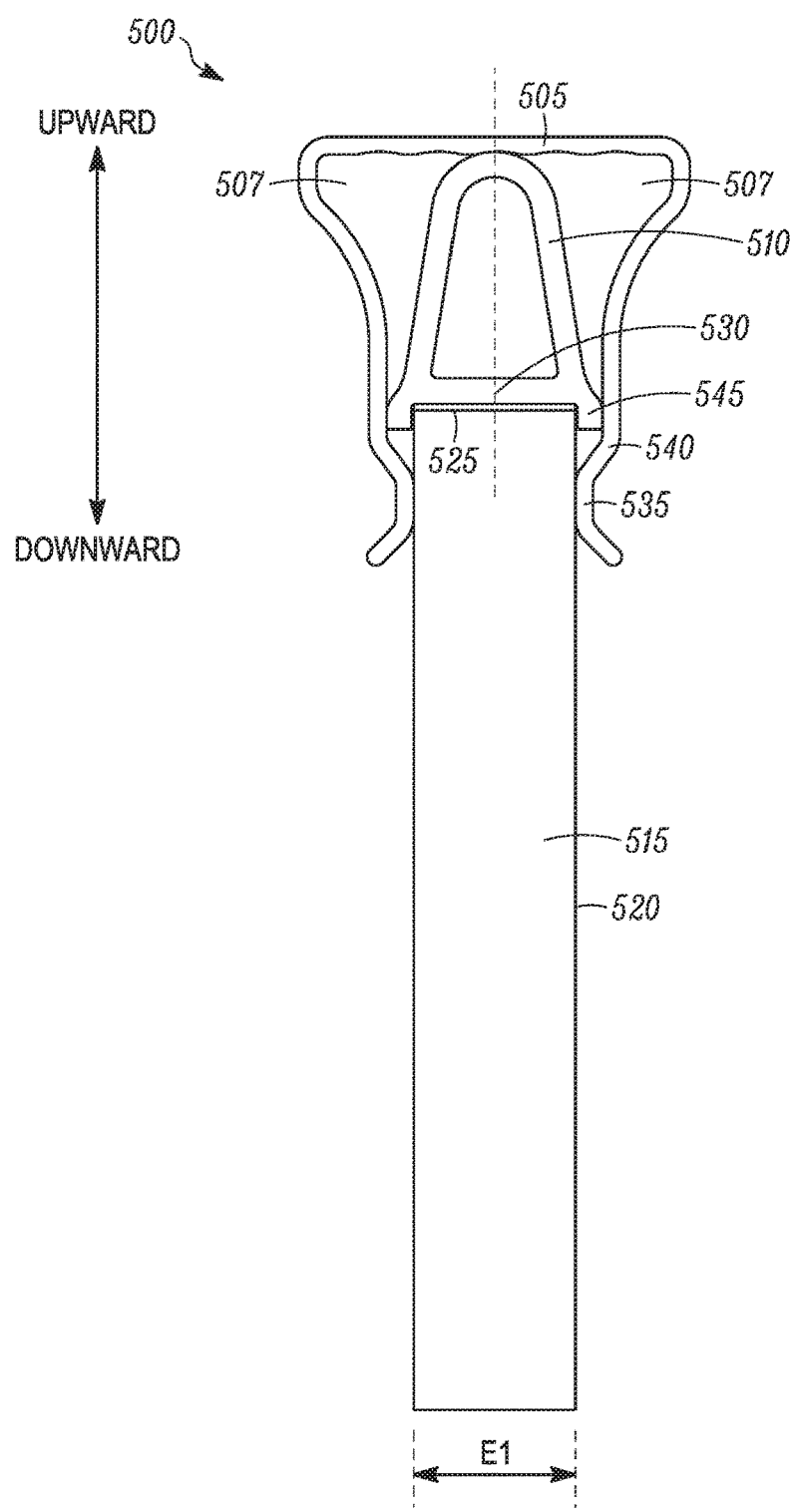

FIGS. 5A-5C show an embodiment of a fixing device 500. The fixing device 500 may be used in the heat exchangers 110, 120 in the refrigeration circuit 100 shown in FIG. 1. The fixing device 500 may include the gasket 300 in FIG. 3. The fixing device 500 may include the clip 400. The fixing device 500 can be the fixing device 600 in FIG. 6. The fixing device 500 may be used as a component to implement the method 700 in FIG. 7. The fixing device 500 may satisfy the data shown in FIG. 8.

As shown in FIG. 5A, a fixing device 500 includes a clip 505 and a gasket 510.

As shown in FIGS. 5A and 5C, in one embodiment, the gasket base portion 530 attaches to a top surface 525 of a heat exchanging coil 515. In one embodiment, the gasket base portion 530 may include adhesive material to secure the attachment.

As shown in FIGS. 5A and 5C, the clip 505 covers the gasket 510. An internal surface of the clip upper portion, e.g. the clip upper portion 407, attaches to a top portion of the gasket 510. The clip 505 clips to two side surfaces of the heat exchanging coil 515. In one embodiment, the middle portion 540 of the clip 505 attaches to an outer surface of the gasket leg portion 545. In one embodiment, the extension portion 535 clips on the sides surfaces 520 of the heat exchanging coil 515.

In one embodiment, the clip 505 can slide up and down in relation to the heat exchanging coil 515. When the clip 505 slides down, the gasket 510 is compressed and deformed. Further, when the clip 505 slides down, the friction structure of the clip 505 may grip the gasket 510 and increase the friction between the clip 505 and the gasket 510.

In one embodiment, as shown in FIG. 5B, the gasket 510 has a length D4. A plurality of clips 505 are installed on the heat exchanging coil 515 with an interval D1. The first clip 505 may be installed from an edge of the gasket 510 at a distance D3.

In one embodiment, as shown in FIG. 5A, the clip has a length of D5.

In one embodiment, as shown in FIG. 5C, the heat exchanging coil 515 has a width E1. In one embodiment, the width E1 of the heat exchanging coil 515 is similar, larger, or smaller than the distance between the two legs of the gasket 510, e.g., the distance G3 between the two legs 321, 322 of the gasket 300 in FIG. 3A-B. In one embodiment, G3 being smaller than E1 provides a more stable attachment between a gasket and a heat exchanging coil. In one embodiment, G3 is at or about 1 inch and E1 is at or about 1 inch.

In one embodiment, as shown in FIG. 5C, the clip 505 includes two receiving areas 507 evenly distributed at two inner sides of the clip 505. The two receiving areas 507 allow the gasket 510 to extend into when compressed, without allowing the gasket 510 to tilt or slant. The gasket 510 is compressed and deformed while the clip 505 moves downward. When the gasket 510 is compressed, the gasket 505 evenly and simultaneously extends into the receiving areas 507 of the clip 505, without tilting or slanting. Such structural configuration between the clip 505 and the gasket 510 provides stable structural support to any load disposed on top of the clip 505.

In one embodiment, D4 is equal or greater than D1. In one embodiment, D1 is equal or greater than D3. In one embodiment, D3 is equal or greater than D5.

In one embodiment, D1, the interval between two clips 505, can be from at or about 20 inches to at or about 25 inches. In another embodiment, D1 can be from at or about 22 inches to at or about 24 inches.

In one embodiment, D3, the distance between an edge of the gasket 510 and the first clip 505, can be from at or about 1 inch to at or about 3 inches. In another embodiment, D3 can be at or about 2 inches.

In one embodiment, D4, the length of a gasket 510, can be from at or about 50 inches to at or about 150 inches. In one embodiment, D4 is at or about 86 inches. In another embodiment, D4 is at or about 103 inches.

In one embodiment, D5 can be from at or about 0.5 inch to at or about 1.5 inches. In one embodiment, D5 can be from at or about 0.71 inches to at or about 1 inch. In another embodiment, D5 can be at or about 0.75 inches.

FIGS. 6A-6G show an embodiment of a compression process 600 of a gasket 615 while the clip 610 is sliding down in relation to a heat exchanging coil 620. The compression process 600 may be conducted on the heat exchangers 110, 120 shown in FIG. 1. The compression process may be performed by the fixing devices 209 in FIGS. 2A-2B. The compression process 600 may be partly performed by the gasket 300 shown in FIGS. 3A-3B. The compression process 600 may be partly performed by the clip 400 shown in FIGS. 4A-4B. The compression process 600 may be performed by the fixing device 500 shown in FIGS. 5A-5C.

Figure 6A:
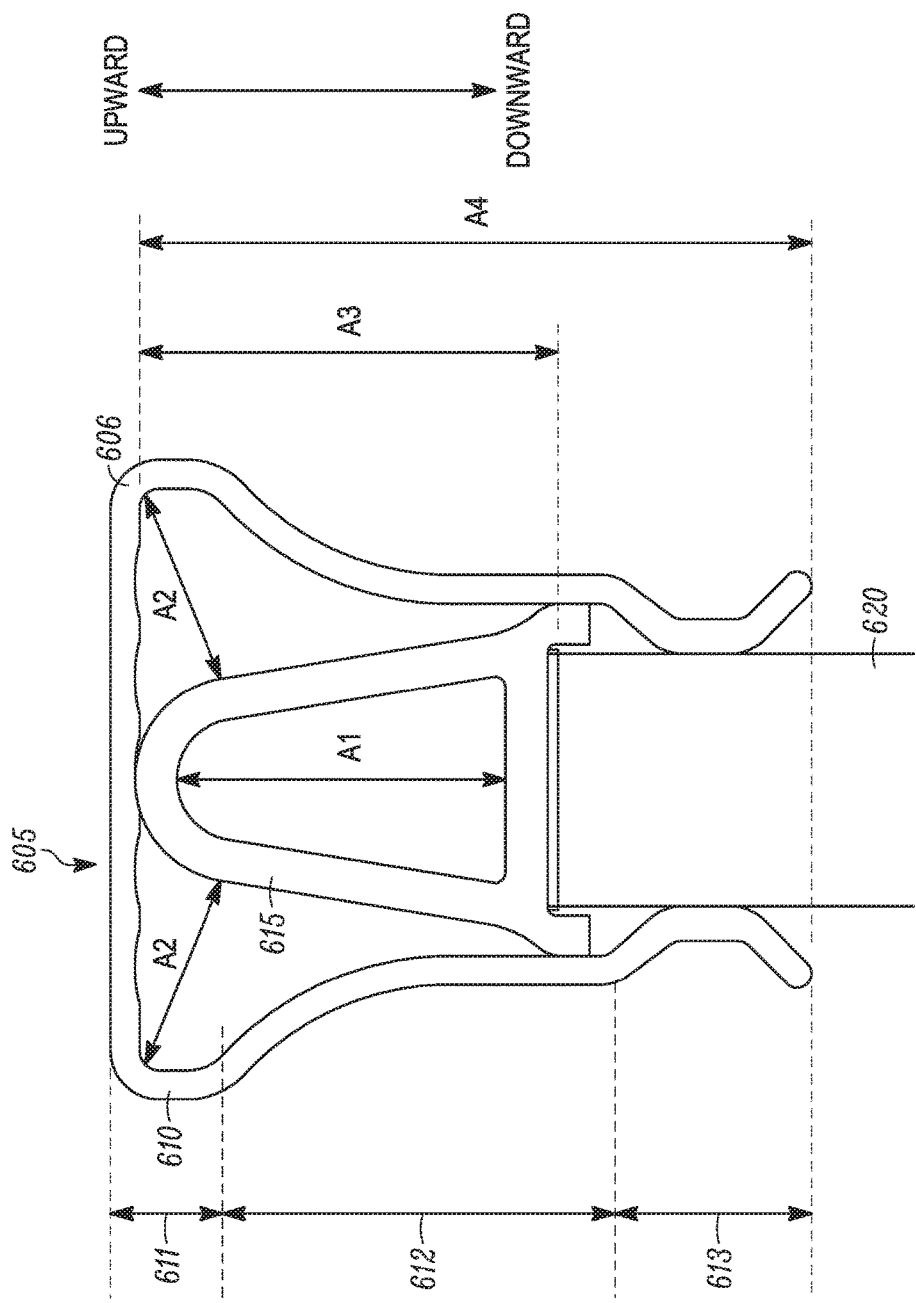
FIGS. 6A-6G illustrate an embodiment of a compression process of a gasket while the clip is sliding down in relation to a heat exchanging coil.
Figure 6C:
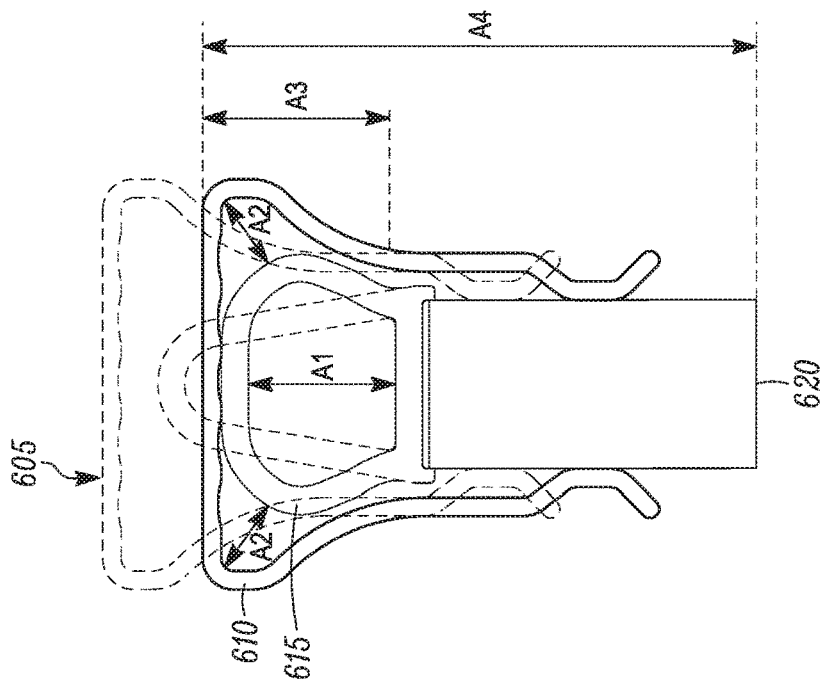

FIG. 6A shows a fixing device 605 in an uncompressed position. As shown in FIG. 6A, the fixing device 605 includes a clip 610 and gasket 615 attaching to a top surface of a heat exchanging coil 620.

As shown in FIG. 6A, the clip 610 has a clip upper portion 611, a clip body portion 612, and a clip leg portion 613. The clip body portion 612 is connected to a lower end of the clip upper portion 611. The clip leg portion 613 is connected to a lower end of the clip body portion 612. As shown in FIG.

6A, the clip upper portion 611, clip body portion 612, and the clip leg portion 613 form an open loop that covers the gasket 615 and clips to the side surfaces of the heat exchanging coil 620.

As shown in FIG. 6A, when uncompressed, the gasket 615 has a height A1. Further, when uncompressed, the gasket 615 has a shortest distance A2 between the gasket 615 and the corner section 606 of the clip 610. The clip upper portion 611 and the clip body portion 612 define two receiving areas 607 around the outer contour of the gasket 615. The two receiving areas 607 are evenly distributed at two inner sides of the clip. Further, when uncompressed, the top inner surface of the clip upper portion 611 has a distance A3 to a top surface of the heat exchanging coil 620. The clip 610 has a height A4.

In one embodiment, the gasket 615 is compressible. While the clip 610 moves downward in relation to the heat exchanging coil 620, the gasket 615 is compressed and deformed. As the clip 610 slides downward, the compressed gasket 615 can gradually and evenly extends into the two receiving areas 607 without tilting or slanting. Because the gasket 615 can be evenly compressed without tilting or slanting, the gasket 615 may provide strong structural support to the clip 605, which in turns support other loading materials on top of it, e.g., a cap, a cover, and/or a top surface panel of a heat exchanger.

As shown in FIGS. 6A-6G, in one embodiment, A4, the height 610 of the clip 610, remains constant during the compression process 600.

Figure 6B:
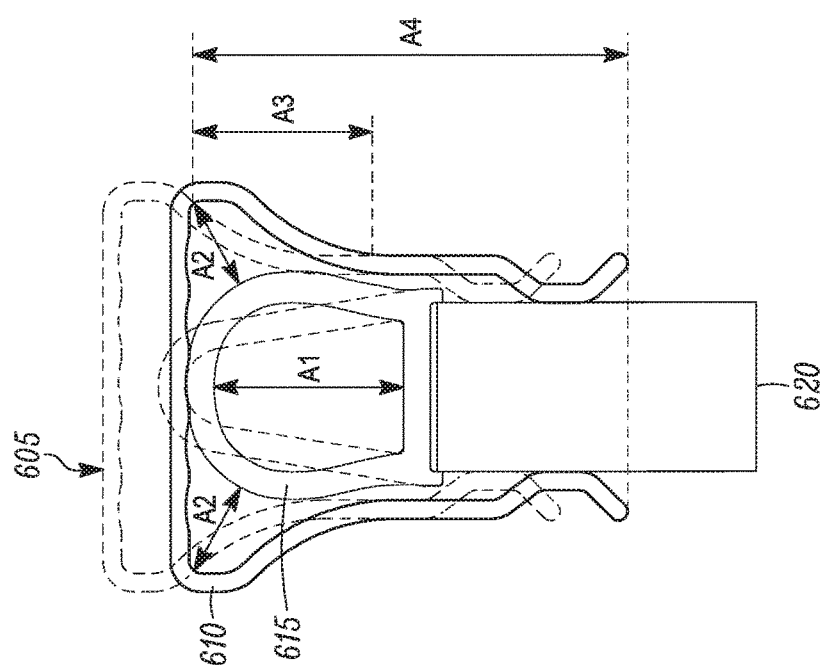
Figure 6E:
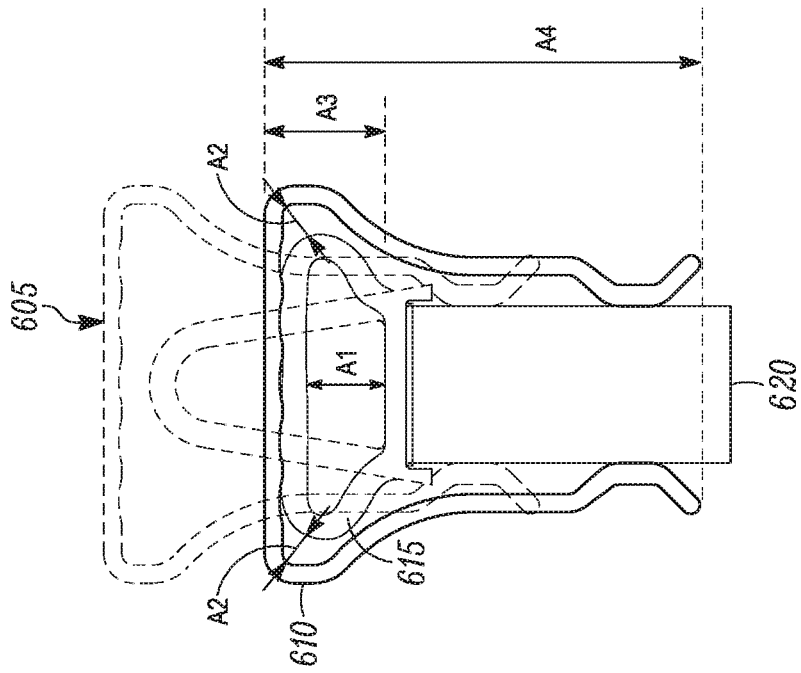
Figure 6D:
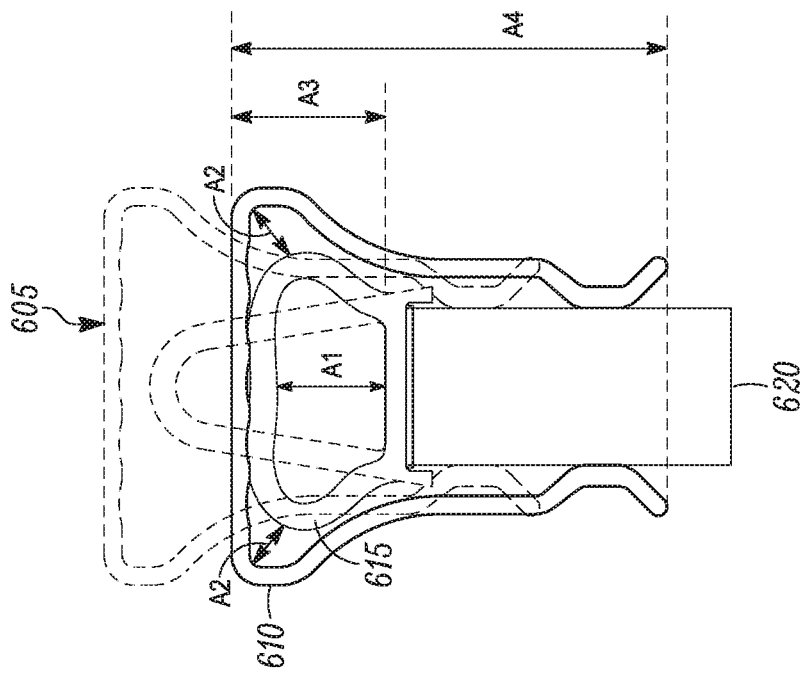

FIG. 6B shows an embodiment that the clip 610 starts to slide down in relation to the heat exchanging coil 620. Compared to FIG. 6A which is showing an uncompressed position, FIG. 6B has a decreased A3 (distance between the top inner surface of the clip upper portion 611 of the clip 610 and the top surface of the heat exchanging coil 620), a decreased A2 (shortest distance between the gasket 615 and the corner section 606 of the clip 610), and a decreased A1 (height of the gasket 615). FIGS. 6C-6F shows a continuously progressing compression process 600 of the gasket 615 by sliding down the clip 610. As shown in FIGS. 6C-6F, A1, A2, and A3 continuously decrease, yet A4 remains constant.

In one embodiment, when the clip 610 slides down in relation to the heat exchanging coil 620, the two A2 (one from each corner 606 of the clip 610 to the gasket 615) simultaneously decreases. This allows the gasket 615 to evenly and simultaneously extends into two receiving areas 607 of the clip 610 when being compressed. Such compression of the gasket 615 can be done without tilting or slanting.

Figure 6G:
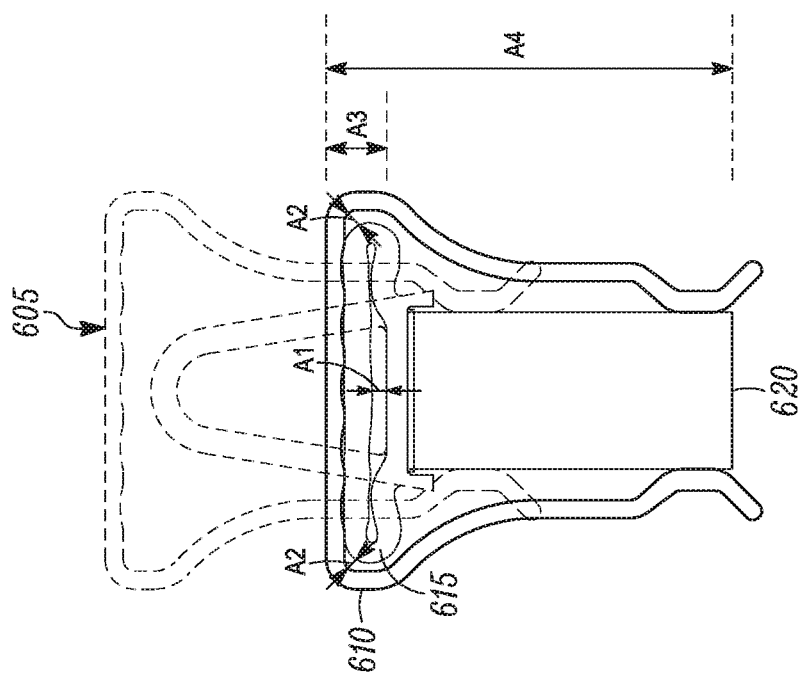
Figure 6F:
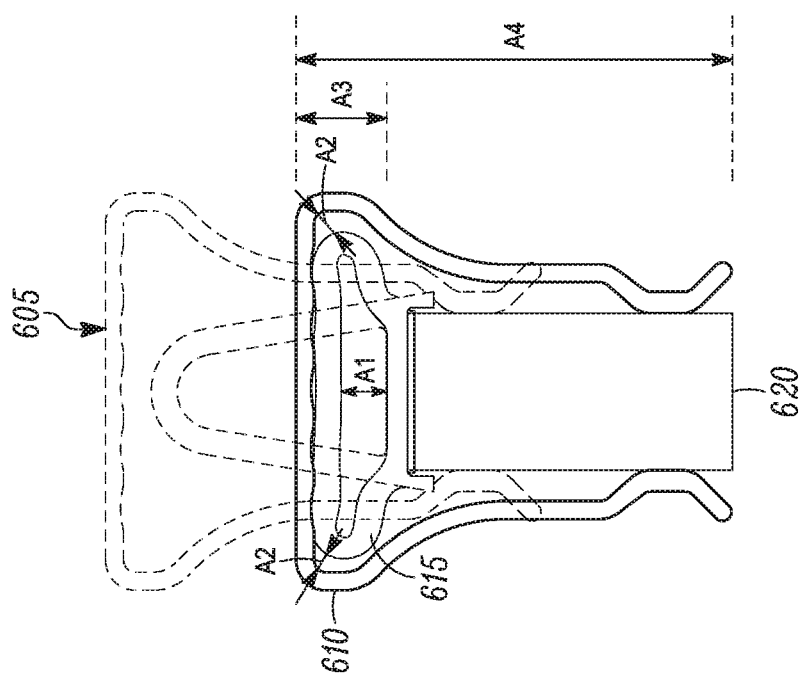

As an embodiment, FIG. 6G shows a state of the compression process 600 wherein the gasket 615 is fully compressed. In one embodiment, when the gasket 615 is fully compressed, the distance A3 (distance between the top inner surface of the clip upper portion 611 of the clip 610 and the top surface of the heat exchanging coil 620) may be about the thickness of a wall of the gasket upper portion (e.g., gasket upper portion 305) plus a thickness of the wall of the gasket base portion (e.g., gasket base portion 315). In one embodiment, the gasket 615 may be made with a relatively more elastic material.

In another embodiment, when the gasket 615 is fully compressed, the distance A3 (distance between the top inner surface of the clip upper portion 611 of the clip 610 and the top surface of the heat exchanging coil 620) may be more than the thickness of a wall of the gasket upper portion (e.g., gasket upper portion 305) plus a thickness of the wall of the gasket base portion (e.g., gasket base portion 315). In this embodiment, the gasket 615 may be made with a relatively less elastic material.

Figure 7:
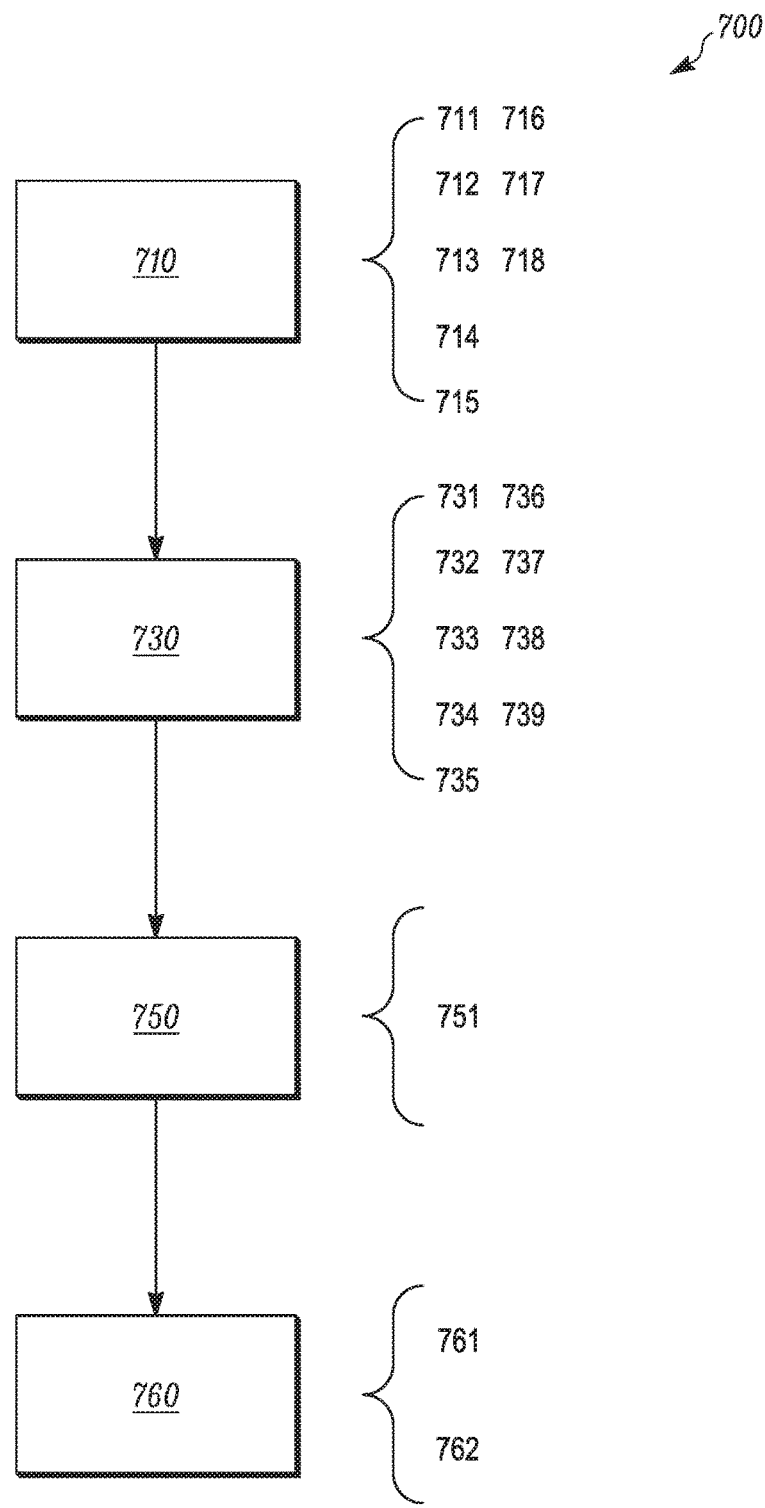
FIG. 7 shows an embodiment of a method of using a fixing device.

FIG. 7 shows an embodiment of a method 700 of using a fixing device. The method 700 can be applied to the heat exchangers 110, 120 in the refrigeration circuit 100 in FIG. 1. The method 700 may applied to the heat exchanger 200 in FIG. 2. The method 700 may include the gasket 300 in FIG. 3. The method may include the clip 400 in FIG. 4. The method may include the fixing device 500 in FIG. 5. The method may include the fixing device 600 in FIG. 6. The method FIG. 7 may include a fixing device that satisfies the data shown in FIG. 8.

The method 700 includes attaching a gasket on a top surface of a heat exchanging coil 710. The step of attaching a gasket on a top surface of a heat exchanging coil 710 may further include that the gasket is in "A" shape 711. The gasket in step 710 may include a gasket upper portion, a gasket intermediate portion connected to a lower end of the gasket upper portion, and a gasket base portion connected to a lower end of the gasket intermediate portion, wherein the gasket upper portion, the gasket intermediate portion, and the gasket base portion together forms a closed loop with a height A1 712. The gasket in step 710 may include a gasket upper portion, wherein a lower end of the gasket upper portion has a width G1 713. The gasket in step 710 may include a gasket intermediate portion, wherein a lower end of the gasket intermediate portion has a width G2 714. The gasket in step 710 may include a gasket leg portion, wherein the gasket leg portion includes the two legs spaced apart with a distance G3 715. In one embodiment, G3 is equal or greater than G2 716. In one embodiment, G2 is equal or greater than G1 717. The gasket in step 710 may have a length from at or about 50 inches to at or about 150 inches 718.

The method 700 includes covering the gasket with a clip 730. The clip in step 730 may include a clip upper portion, a clip body portion connected to a lower end of the clip upper portion, and a clip leg portion connected to a lower end of the clip body portion, wherein the clip upper portion, the clip body portion, and the clip leg portion are connected to form an open loop, the open loop has an opening facing downward 731. The clip in step 730 may include a clip upper portion, which has a width C1 732. The clip in step 730 may include a clip leg portion, a lower end of the clip leg portion has a width C4 733. The clip in step 730 may include a clip body portion which further includes a first transition portion, a middle portion connected to a lower end of the transition portion, a second transition portion connected to a lower end of the middle portion, and an extension portion connected to a lower end of the second transition portion; the middle portion has a width C2; the extension portion has a width C3 734. In one embodiment, C1 is equal or greater than C2, and C2 is equal or greater than C3 735. In one embodiment, C4 is equal or greater than C3 736. In one embodiment, the clip at 730 has a length D5, wherein D5 can be from at or about 0.5 inch to at or about 1.5 inches 737. In one embodiment, the method 700 may include covering the gasket with a plurality of clips, wherein two clips are installed with an interval D1 738. In one embodiment, the interval D1 can be from at or about 20 inches to at or about 25 inches 739.

The method 700 includes clipping the clip on the heat exchanging coil through the clip body portion of the clip 750. The step 750 includes clipping the clip on the heat exchanging coil through the extension portion of the clip 751.

The method 700 includes sliding down the clip, such that gasket is compressed 760. In one embodiment, at step 760, a height of the gasket A1, a shortest distance between the gasket and the corner section of the clip, and a distance A3 between the clip upper portion and the top surface of the heat exchanging are decreased compared to an uncompressed position 761. In one embodiment, when the gasket is fully compressed, a distance A3 between the clip upper portion and the top surface of the heat exchanging is about a thickness of a wall of the base plus a thickness of a wall of the upper portion of the gasket 762.

Figure 8:
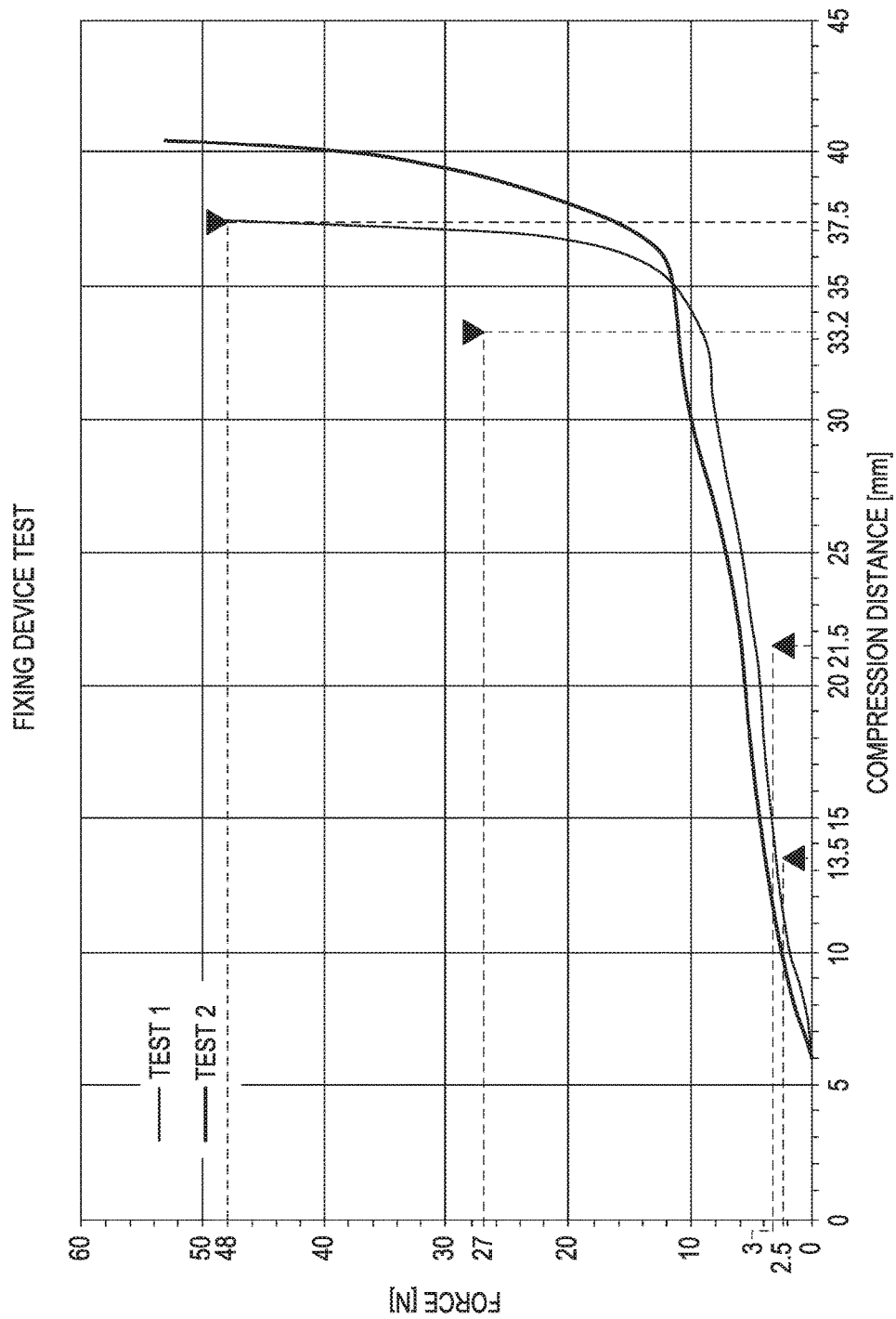
FIG. 8 shows exemplary testing results of two embodiments of fixing devices.

FIG. 8 shows exemplary testing results of two embodiments of fixing devices. The x axis of FIG. 8 shows the compression distance. The compression distance is defined to be the difference between the gasket height in uncompressed situation and fully compressed situation. The compression distance can be expressed as follows: A1_uncompressed—A1_fully compressed. In one embodiment, A1_uncompressed can be the A1 shown in FIG. 6A. In another embodiment, A1_fully compressed can be the A1 shown in FIG. 6G.

The y axis of FIG. 8 shows the force that is required to compress the gasket.

The two upward pointing triangles are two exemplary specification requirements. One upward pointing triangle shows that when the compression distance is at 13.5 mm, the force should be at or more than 2.5 Newton. The other upward pointing triangle shows that when the compression distance is at 21.5 mm, the force should be at or more than 3 Newton.

The two downward pointing triangles are two exemplary specification requirements. One downward pointing triangle shows that when the compression distance is at 33.2 mm, the force should be at or less than 27 Newton. One downward pointing triangle shows that when the compression distance is 37.5 mm, the force should be at or less than 48 Newton.

FIG. 8 shows the testing results of TEST 1 and TEST 2. TEST 1 and TEST 2 are two embodiments of the fixing device. Both TEST 1 and TEST 2 meet the specification requirements. The embodiments of the fixing devices used in TEST 1 and TEST 2 may include a gasket and a clip. The fixing devices used in TEST 1 and TEST 2 may be installed on a heat exchanging coil. The benefits of the fixing device used in TEST 1 and TEST 2 may include easy-to-assemble, low cost, vibration reduction during shipping, gasket slanting prevention, or the like.

It is noted that the various embodiments of the fixing device described herein are exemplary only and are in no way limiting the true scope of the invention reflected in the claims.

ASPECTS

Any of aspects 1-9 can be combined with any of aspects 10-17 and 18-40. Any aspects of 10-17 can be combined with any aspects of 18-40.

1. A fixing device, comprising:
    a gasket, the gasket further including
        a gasket upper portion;
        a gasket intermediate portion connected to a lower end of the gasket upper portion;
        a gasket base portion connected to a lower end of the gasket intermediate portion; and
        a gasket leg portion connected to a lower end of the gasket base portion, the gasket leg portion including two legs extending downward from the gasket base portion in a direction away from the gasket intermediate portion,
        wherein the gasket upper portion, the gasket intermediate portion, and the gasket base portion form a closed loop;
    a clip, the clip further including
        a clip upper portion;
        a clip body portion connected to a lower end of the clip upper portion; and
        a clip leg portion connected to a lower end of the clip body portion, the clip leg portion including two legs extending downward from the clip body portion,
        wherein the clip upper portion has a width wider than the clip body portion and the clip leg portion, the clip upper portion, the clip body portion, and the clip leg portion are connected to form an open loop, the open loop has an opening facing downward, the clip upper portion and the clip body portion define two receiving areas evenly distributed at two inner sides of the clip,
    wherein an inner surface of the clip generally faces an outer surface of the gasket, two receiving areas are defined between the clip and the gasket, the receiving areas are in an area distribution, each receiving area includes an upper receiving area, a first upper receiving area is defined by the clip upper portion and a first side of the gasket, a second upper receiving area is defined by the clip upper portion and a second side of the gasket, the first and second upper receiving areas are receivable of the gasket, the gasket extends into the first and second upper receiving areas when the clip moves downward in relation to the gasket.

2. The fixing device according to aspect 1, wherein
    the gasket is made with elastic material, the gasket is configured such that a transactional area of the gasket is compressible.

3. The fixing device according to any one of aspects 1-2, wherein
    the gasket upper portion is curved, the gasket upper portion has a width G1 at its lower end.

4. The fixing device according to any one of aspects 1-3, wherein
    the gasket intermediate portion has a width at its upper end same as the width G1 at the lower end of the gasket upper portion;
    the gasket intermediate portion has a width G2 at its lower end;
    G2 is equal or greater than G1.

5. The fixing device according to any one of aspects 1-4, wherein
    the two legs of the of the gasket leg portion has a distance G3 between each other,
    G3 is equal to greater than G2.

6. The fixing device according to any one of aspects 1-5, wherein
    the clip upper portion includes two corner sections, the clip upper portion has a width C1.

7. The fixing device according to any one of aspects 1-6, wherein
    the clip body portion includes a first transition portion, a middle portion, a second transition portion, and an extension portion,
    the first transition portion is connected to the lower end of the clip upper portion, first transition portion extends downward and inward from the clip upper portion, the middle portion is connected to a lower end of the first transition portion, the middle portion extends downward from the first transition portion, the middle portion has a width C2, the second transition portion is connected to a lower end of the middle portion, the second transition extends downward and inward from the middle portion, the extension portion is connected to a lower end of the second transition portion, the extension portion extends downward from the second transition portion, the extension portion has a width C3, C3 is equal or smaller than C2.

8. The fixing device according to any one of aspects 4-7, wherein

C is equal or greater than C2,

C2 is equal or greater than C3.

9. The fixing device according to any one of aspects 4-8, wherein the two legs of the clip leg portion has a width C4 at its lower end, C4 is equal or greater than C3.

10. A heat exchanger, comprising a heat exchanging coil;

a gasket disposed on top of the heat exchanging coil;

a plurality of clips disposed on top of the heat exchanging coil, each clip has an inner surface facing an outer surface of the gasket, the clips being disposed along an direction of the heat exchanging coil with an interval D1 between two clips;

the gasket further including a gasket upper portion;

a gasket intermediate portion connected to a lower end of the gasket upper portion;

a gasket base portion connected to a lower end of the gasket intermediate portion; and a gasket leg portion connected to a lower end of the gasket base portion, the gasket leg portion including two legs extending downward from the gasket base portion in a direction away from the gasket intermediate portion, wherein the gasket upper portion, the gasket intermediate portion, and the gasket base portion form a closed loop;

the clip further including a clip upper portion;

a clip body portion connected to a lower end of the clip upper portion; and a clip leg portion connected to a lower end of the clip body portion, the clip leg portion including two legs extending downward from the clip body portion, wherein the clip upper portion has a width wider than the clip body portion and the clip leg portion, the clip upper portion, the clip body portion, and the clip leg portion are connected to form an open loop, the open loop has an opening facing downward, the clip upper portion and the clip body portion define two receiving areas evenly distributed at two inner sides of the clip, wherein an inner surface of the clip generally faces an outer surface of the gasket, two receiving areas are defined between the clip and the gasket, the receiving areas are in an area distribution, each receiving area includes an upper receiving area, a first upper receiving area is defined by the clip upper portion and a first side of the gasket, a second upper receiving area is defined by the clip upper portion and a second side of the gasket, the first and second upper receiving areas are receivable of the gasket, the gasket extends into the first and second upper receiving areas when the clip moves downward in relation to the gasket.

11. The heat exchanger according to aspect 10, wherein the gasket base portion attaches to a top surface of the heat exchanging coil, the two legs of the gasket leg portion attach to side surfaces of the heat exchanging coil.

12. The heat exchanger according to any one of aspects 10-11, wherein the gasket base portion attaches to a top surface of the heat exchanging coil through adhesive materials.

13. The heat exchanger according to any one of aspects 10-12, wherein the clip upper portion attaches to the gasket upper portion.

14. The heat exchanger according to any one of aspects 10-13, wherein

The clip body portion attaches to two side surfaces of the heat exchanging coil.

15. The heat exchanger according to any one of aspects 10-14, wherein the gasket base portion attaches to a top surface of the heat exchanging coil, the two legs of the gasket leg portion attach to two side surfaces of the heat exchanging coil, the clip body portion attaches to the two side surfaces of the heat exchanging coil at position lower than the two legs of the gasket log portion.

16. The heat exchanger according to any one of aspects 10-15, wherein the clip body portion attaches to the gasket leg portion.

17. The heat exchanger according to any one of aspects 10-16, wherein the gasket attaches to a top surface of the heat exchanging coil through an adhesive material.

18. A method to install a fixing device on a heat exchanger, comprising attaching a gasket on a top surface of a heat exchanging coil, covering the gasket with a clip, clipping the clip on the heat exchanging coil through a clip body portion of the clip, sliding down the clip, such that gasket is compressed, wherein the gasket is evenly and simultaneously compressed into two receiving areas of the clip.

19. The method according to aspect 18, wherein the step of attaching a gasket on a top surface of a heat exchanging coil further includes that the gasket is in "A" shape.

20. The method according to any one of the aspects 18-19, wherein the gasket includes a gasket upper portion, a gasket intermediate portion connected to a lower end of the gasket upper portion, and a gasket base portion connected to a lower end of the gasket intermediate portion, wherein the gasket upper portion, the gasket intermediate portion, and the gasket base portion together forms a closed loop with a height A1.

21. The method according to any one of the aspects 18-20, wherein the gasket includes a gasket upper portion, wherein a lower end of the gasket upper portion has a width G1.

22. The method according to any one of the aspects 18-21, wherein the gasket includes a gasket intermediate portion, wherein a lower end of the gasket intermediate portion has a width G2.

23. The method according to any one of the aspects 18-22, wherein the gasket includes a gasket leg portion, wherein the leg portion includes two legs spaced apart with a distance G3.

24. The method according to aspects 23, wherein G3 is equal or greater than G2.

25. The method according to aspects 22, wherein G2 is equal or greater than G1.

26. The method according to any one of the aspects 18-25, wherein the gasket has a length from at or about 50 inches to at or about 150 inches.

27. The method according to any one of the aspects 18-26, wherein the clip includes
a clip upper portion,
a clip body portion connected to a lower end of the clip upper portion, and
a clip leg portion connected to a lower end of the clip body portion,
wherein the clip upper portion, the clip body portion, and the clip leg portion are connected to form an open loop, the open loop has an opening facing downward.

28. The method according to any one of the aspects 18-27, wherein the clip includes
a clip upper portion, the clip upper portion has a width C1.

29. The method according to any one of the aspects 18-28, wherein the clip includes
a clip leg portion, wherein a lower end of the clip leg portion has a width C4.

30. The method according to any one of the aspects 18-29, wherein the clip body portion further includes
a first transition portion,
a middle portion connected to a lower end of the transition portion, the middle portion has a width C2,
a second transition portion connected to a lower end of the middle portion, and
an extension portion connected to a lower end of the second transition portion, the extension portion has a width C3.

31. The method according to aspect 30, wherein
C1 is equal or greater than C2, and C2 is equal or greater than C3.

32. The method according to any of aspects 30-31, wherein
C4 is equal or greater than C3.

33. The method according to any of aspects 18-32, wherein
the clip has a length D5, wherein D5 is from at or about 0.5 inch to at or about 1.5 inches.

34. The method according to any one of aspects 18-33, further includes
covering the gasket with a plurality of clips, wherein two clips are installed with an interval D1.

35. The method according to aspect 34, wherein
the interval D1 is from at or about 20 inches to at or about 25 inches.

36. The method according to any one of aspects 18-35, further includes
clipping the clip on the heat exchanging coil through a clip body portion of the clip.

37. The method according to any one of aspects 18-36, further includes
clipping the clip on the heat exchanging coil through an extension portion of the clip.

38. The method according to any one of aspects 18-37, further includes
a height of the gasket A1,
a shortest distance A2 between the gasket and a corner section of the clip, and
a distance A3 between a clip upper portion and a top surface of the heat exchanging coil,
wherein A1, A2, and A3 are decreased compared to an uncompressed position.

39. The method according to any one of aspects 18-38, further includes
two shortest distances A2 between the gasket and two corner sections of the clip,
wherein while the clip is sliding down the two A2 are simultaneously reduced.

40. The method according to any one of aspects 18-38, wherein
when the gasket is fully compressed, a distance A3 between a clip upper portion and a top surface of the heat exchanging is about a thickness of a wall of the base plus a thickness of a wall of the upper portion of the gasket.

We claim:
1. A fixing device, comprising:
a gasket, the gasket further including
a gasket upper portion;
a gasket intermediate portion connected to a lower end of the gasket upper portion;
a gasket base portion connected to a lower end of the gasket intermediate portion; and
a gasket leg portion connected to a lower end of the gasket base portion,
a clip, the clip further including
a clip upper portion;
a clip body portion connected to a lower end of the clip upper portion; and
a clip leg portion connected to a lower end of the clip body portion,
wherein the clip upper portion has a width wider than the clip body portion and the clip leg portion, the clip upper portion, the clip body portion, and the clip leg portion are connected to include an opening facing downward,
wherein an inner surface of the clip generally faces an outer surface of the gasket, two receiving areas are defined between the clip and the gasket, the receiving areas are in an area distribution, the area distribution includes a first upper receiving area is disposed between the clip upper portion and a first side of the gasket, a second upper receiving area is disposed between the clip upper portion and a second side of the gasket, the first and second upper receiving areas are receivable of the gasket, the gasket extends into the first and second upper receiving areas when the clip moves downward in relation to the gasket.

2. The fixing device according to claim 1, wherein
the gasket upper portion is curved, and
the gasket intermediate portion has a width, the width increases from a top to bottom direction.

3. The fixing device according to claim 1, wherein
the clip upper portion includes a clip friction structure, the clip friction structure increases a friction between the clip and the gasket.

4. The fixing device according to claim 1, wherein
the two receiving areas are in even distribution.

5. The fixing device according to claim 1, wherein
the clip upper portion includes two corner sections, the clip upper portion has a width C1, the clip body portion includes a first transition portion, a middle portion, a second transition portion, and an extension portion, the first transition portion is connected to the lower end of the clip upper portion, first transition portion extends downward and inward from the clip upper portion, the middle portion is connected to a lower end of the first transition portion, the middle portion extends downward from the first transition portion, the middle portion has a width C2, the second transition portion is connected to a lower end of the middle portion, the second transition extends downward and inward from the middle portion, the extension portion is connected to a lower end of the second transition portion, the extension portion extends downward from the second transition portion, the extension portion has a width C3, C1 is greater than C2, and C2 is greater than C3.

6. The fixing device according to claim 5, wherein the two legs of the clip leg portion has a width C4 at its lower end, and C4 is equal or greater than C3.

7. The fixing device according to claim 1, wherein the clip upper portion includes two corner sections, each corner section has a distance to the gasket, the two distances are equal to each other, the distances for both corner sections simultaneously decrease while the clip moves downward.

8. A heat exchanger, comprising a heat exchanging coil;

a gasket disposed on top of the heat exchanging coil;

a plurality of clips disposed on top of the heat exchanging coil, each clip covers that gasket and clips to two side surfaces of the heat exchanging coil, the clips being disposed along an direction of the heat exchanging coil with an interval D1 between two clips;

the gasket further including a gasket upper portion;

a gasket intermediate portion connected to a lower end of the gasket upper portion;

a gasket base portion connected to a lower end of the gasket intermediate portion; and a gasket leg portion connected to a lower end of the gasket base portion, the gasket leg portion including two legs extending downward from the gasket base portion in a direction away from the gasket intermediate portion, wherein the gasket upper portion, the gasket intermediate portion, and the gasket base portion form a closed loop;

the clip further including a clip upper portion;

a clip body portion connected to a lower end of the clip upper portion; and a clip leg portion connected to a lower end of the clip body portion, the clip leg portion including two legs extending downward from the clip body portion, wherein the clip upper portion has a width wider than the clip body portion and the clip leg portion, the clip upper portion, the clip body portion, and the clip leg portion are connected to form an open loop, the open loop has an opening facing downward, wherein an inner surface of the clip generally faces an outer surface of the gasket, two receiving areas are defined between the clip and the gasket, the receiving areas are in an area distribution, the area distribution includes a first upper receiving area is disposed between the clip upper portion and a first side of the gasket, a second upper receiving area is disposed between the clip upper portion and a second side of the gasket, the first and second upper receiving areas are receivable of the gasket, the gasket extends into the first and second upper receiving areas when the clip moves downward in relation to the gasket.

9. The heat exchanger according to claim 8, wherein the gasket upper portion is curved, and the gasket intermediate portion has a width, the width increases from a top to bottom direction.

10. The heat exchanger according to claim 8, wherein the two receiving areas are in even distribution.

11. The heat exchanger according to claim 10, wherein

The two legs of the gasket leg portion has a distance between each other, the distance is greater than the width of the gasket intermediate portion.

12. The heat exchanger according to claim 8, wherein the clip upper portion includes two corner sections, the clip upper portion has a width C1, the clip body portion includes a first transition portion, a middle portion, a second transition portion, and an extension portion, the first transition portion is connected to the lower end of the clip upper portion, first transition portion extends downward and inward from the clip upper portion, the middle portion is connected to a lower end of the first transition portion, the middle portion extends downward from the first transition portion, the middle portion has a width C2, the second transition portion is connected to a lower end of the middle portion, the second transition extends downward and inward from the middle portion, the extension portion is connected to a lower end of the second transition portion, the extension portion extends downward from the second transition portion, the extension portion has a width C3, C1 is greater than C2, and C2 is greater than C3.

13. The heat exchanger according to claim 12, wherein the two legs of the clip leg portion has a width C4 at its lower end, and C4 is equal or greater than C3.

14. The heat exchanger according to claim 8, wherein the clip upper portion includes two corner sections, each corner section has a distance to the gasket, the two distances are equal to each other, the distances for both corner sections simultaneously decrease while the clip moves downward.

15. A method to install a fixing device on a heat exchanger, comprising attaching a gasket on a top surface of a heat exchanging coil, covering the gasket with a clip, clipping the clip on the heat exchanging coil through a clip body portion of the clip, compressing the gasket by sliding down the clip, wherein the gasket is compressed into a first receiving area and a second receiving area, the first receiving area is disposed between an clip upper portion of the clip and a first side of the gasket, the second receiving area is disposed between the clip upper portion of the clip and a second side of the gasket, the first receiving area and the second receiving area are in area distribution.

16. The method according to claim 15, wherein
the gasket has a width, the width of the gasket increases from a top to bottom direction.

17. The method according to claim 15, wherein
the clip has a width, the width of the clip decreases from a top to bottom direction, and
the upper portion of the clip includes a friction structure, the friction structure increases the friction between the clip and the gasket.

18. The method according to claim 15, wherein
The first receiving area and the second receiving area are in even distribution.

19. The method according to claim 15, wherein the gasket includes
a gasket upper portion,
a gasket intermediate portion connected to a lower end of the gasket upper portion, and
a gasket base portion connected to a lower end of the gasket intermediate portion,
wherein the gasket upper portion, the gasket intermediate portion, and the gasket base portion together forms a closed loop with a height.

20. The method according claim 19, wherein the clip includes
a clip upper portion,
a clip body portion connected to a lower end of the clip upper portion, and
a clip leg portion connected to a lower end of the clip body portion,
wherein the clip upper portion, the clip body portion, and the clip leg portion are connected to form an open loop, the open loop has an opening facing downward.

\* \* \* \* \*